United States Patent
Vacanti et al.

(10) Patent No.: US 10,627,503 B2
(45) Date of Patent: Apr. 21, 2020

(54) COMBINED DEGRADED VISUAL ENVIRONMENT VISION SYSTEM WITH WIDE FIELD OF REGARD HAZARDOUS FIRE DETECTION SYSTEM

(71) Applicant: Honeywell International Inc., Morris Plains, NJ (US)

(72) Inventors: David C. Vacanti, Renton, WA (US); Seth Frick, Saint Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 443 days.

(21) Appl. No.: 15/474,804

(22) Filed: Mar. 30, 2017

(65) Prior Publication Data

US 2018/0284254 A1    Oct. 4, 2018

(51) Int. Cl.
*G01S 13/44* (2006.01)
*G01S 13/72* (2006.01)
(Continued)

(52) U.S. Cl.
CPC .......... *G01S 13/4472* (2013.01); *F41H 11/00* (2013.01); *G01S 7/352* (2013.01);
(Continued)

(58) Field of Classification Search
CPC .......... F41H 11/00; F41H 11/02; F41G 3/147; G01S 7/38; G01S 7/495; G01S 13/58;
(Continued)

(56) References Cited

U.S. PATENT DOCUMENTS

| 4,739,329 A | * | 4/1988 | Ward | ............ G01S 7/003 342/119 |
| 5,132,693 A | | 7/1992 | Werp | |

(Continued)

FOREIGN PATENT DOCUMENTS

| CN | 201238075 Y | 5/2009 |
| CN | 103887584 A | 6/2014 |

(Continued)

OTHER PUBLICATIONS

"Series FPGAs Overview," DS180, Xilinx, Inc., retrieved from http://www.xilinx.com/support/documentation/data_sheets/ds180_7Series_Overview.pdf on May 23, 2016, 17 pp.

(Continued)

*Primary Examiner* — Peter M Bythrow
(74) *Attorney, Agent, or Firm* — Shumaker & Sieffert, P.A.

(57) ABSTRACT

A hazardous fire detection radar system that may be mounted on a vehicle, such as an aircraft to detect bullets, grenades and similar projectiles that may pose a danger to the vehicle. The system may observe a wide field-of-regard (FOR) and for each projectile, determine the range of closest approach to the host platform (miss distance) and an approximate direction of origin. The FMCW radar system measures range and Doppler information for targets within its FOR and resolves Doppler ambiguity by estimating angular information (azimuth and elevation) for each target projectile. The system may estimate angular information by using a monopulse antenna pattern with the radar receiver.

20 Claims, 20 Drawing Sheets

(51) Int. Cl.

| | |
|---|---|
| G01S 7/35 | (2006.01) |
| G01S 13/50 | (2006.01) |
| F41H 11/00 | (2006.01) |
| G01S 13/88 | (2006.01) |
| G01S 13/02 | (2006.01) |
| G01S 7/02 | (2006.01) |
| F41H 11/02 | (2006.01) |
| G01S 13/94 | (2006.01) |

(52) U.S. Cl.
CPC .......... *G01S 13/44* (2013.01); *G01S 13/4463* (2013.01); *G01S 13/505* (2013.01); *G01S 13/72* (2013.01); *G01S 13/88* (2013.01); *F41H 11/02* (2013.01); *G01S 13/94* (2013.01); *G01S 2007/027* (2013.01); *G01S 2013/0254* (2013.01)

(58) Field of Classification Search
CPC ........ G01S 13/66; G01S 13/72; G01S 13/862; G01S 13/867; G01S 13/883
See application file for complete search history.

(56) References Cited

U.S. PATENT DOCUMENTS

| | | | | |
|---|---|---|---|---|
| 5,483,865 | A * | 1/1996 | Brunand | F41G 3/22 342/66 |
| 5,486,832 | A | 1/1996 | Hulderman | |
| 5,631,654 | A * | 5/1997 | Karr | G01S 11/12 250/342 |
| 5,757,310 | A * | 5/1998 | Millward | G01S 13/426 342/107 |
| 5,917,442 | A * | 6/1999 | Manoogian | F41G 7/008 244/3.14 |
| 6,037,896 | A * | 3/2000 | Dekker | F41G 3/142 342/119 |
| 6,262,680 | B1 * | 7/2001 | Muto | G01S 13/723 244/3.1 |
| 6,771,205 | B1 * | 8/2004 | Barton | G01S 13/72 342/13 |
| 7,019,682 | B1 | 3/2006 | Louberg et al. | |
| 7,071,867 | B2 | 7/2006 | Wittenberg et al. | |
| 7,151,478 | B1 * | 12/2006 | Adams | G01S 13/325 342/62 |
| 7,205,932 | B2 * | 4/2007 | Fiore | G01S 13/32 342/104 |
| 7,236,122 | B2 * | 6/2007 | Pappert | F41G 5/08 342/53 |
| 7,492,308 | B2 * | 2/2009 | Benayahu | F41H 7/00 244/3.1 |
| 7,508,336 | B2 * | 3/2009 | Leskiw | G01S 13/726 342/108 |
| 7,696,919 | B2 * | 4/2010 | Moraites | F41G 3/147 342/107 |
| 7,808,439 | B2 | 10/2010 | Yang et al. | |
| 7,973,616 | B2 | 7/2011 | Shijo et al. | |
| 8,149,156 | B1 * | 4/2012 | Allred | G01S 13/583 342/146 |
| 8,368,583 | B1 | 2/2013 | Piesinger | |
| 8,570,211 | B1 | 10/2013 | Piesinger | |
| 8,648,676 | B2 | 2/2014 | Abhari et al. | |
| 8,665,142 | B2 | 3/2014 | Shijo et al. | |
| 8,672,223 | B2 * | 3/2014 | Factor | F41H 11/02 235/400 |
| 8,981,989 | B2 * | 3/2015 | Gould | G01S 7/35 342/113 |
| 9,035,838 | B2 | 5/2015 | Le Bars et al. | |
| 9,103,628 | B1 | 8/2015 | Moraites et al. | |
| 9,109,862 | B2 * | 8/2015 | Factor | G01S 7/38 |
| 9,146,251 | B2 | 9/2015 | Moraites et al. | |
| 9,246,228 | B2 | 1/2016 | Lee et al. | |
| 9,360,370 | B2 | 6/2016 | Moraites et al. | |
| 2002/0007726 | A1 * | 1/2002 | Boissiere | F41A 27/22 89/36.17 |
| 2003/0117309 | A1 * | 6/2003 | Pappert | F41H 11/02 342/13 |
| 2005/0275582 | A1 * | 12/2005 | Mohan | G01S 7/414 342/13 |
| 2006/0028373 | A1 * | 2/2006 | Fullerton | F41H 11/00 342/67 |
| 2006/0028374 | A1 * | 2/2006 | Fullerton | F41G 5/08 342/67 |
| 2006/0092075 | A1 * | 5/2006 | Bruce | G01S 7/02 342/175 |
| 2006/0097102 | A1 * | 5/2006 | Chang | F41H 5/007 244/3.19 |
| 2006/0175464 | A1 * | 8/2006 | Chang | F41H 5/007 244/3.19 |
| 2007/0018884 | A1 * | 1/2007 | Adams | G01S 3/30 342/147 |
| 2007/0040062 | A1 * | 2/2007 | Lau | F41G 3/147 244/3.16 |
| 2007/0052806 | A1 * | 3/2007 | Bnayahu | F41H 11/02 348/155 |
| 2007/0075182 | A1 * | 4/2007 | Fetterly | F41G 7/224 244/3.16 |
| 2008/0117098 | A1 * | 5/2008 | Johnson | G01S 7/062 342/25 F |
| 2008/0273190 | A1 * | 11/2008 | Smith | F41G 3/14 356/4.01 |
| 2009/0091490 | A1 * | 4/2009 | Tu | G01S 7/295 342/160 |
| 2009/0164122 | A1 | 6/2009 | Morbey et al. | |
| 2009/0174589 | A1 * | 7/2009 | Moraites | F41G 3/147 342/14 |
| 2009/0285055 | A1 * | 11/2009 | Barger | B64C 27/04 367/188 |
| 2010/0253567 | A1 * | 10/2010 | Factor | G01S 7/36 342/52 |
| 2011/0069145 | A1 * | 3/2011 | Weber | G06T 7/70 348/36 |
| 2013/0021195 | A1 * | 1/2013 | Gould | G01S 7/35 342/113 |
| 2013/0321227 | A1 | 12/2013 | Ratajczak | |
| 2014/0139366 | A1 | 5/2014 | Moses et al. | |
| 2014/0142838 | A1 | 5/2014 | Durand | |
| 2014/0184456 | A1 | 7/2014 | Lee et al. | |
| 2014/0209678 | A1 * | 7/2014 | Factor | G01S 7/38 235/400 |
| 2015/0287224 | A1 | 10/2015 | Hooper et al. | |
| 2015/0301169 | A1 * | 10/2015 | De Pasquale | G01S 13/88 342/146 |
| 2016/0036110 | A1 | 2/2016 | Cheng et al. | |
| 2016/0048129 | A1 * | 2/2016 | Kolanek | F41H 11/02 701/2 |
| 2016/0061949 | A1 * | 3/2016 | Mohamadi | G01S 13/89 342/21 |
| 2016/0069994 | A1 | 3/2016 | Allen et al. | |
| 2016/0139254 | A1 | 5/2016 | Wittenberg | |

FOREIGN PATENT DOCUMENTS

| | | |
|---|---|---|
| CN | 103022707 B | 10/2014 |
| CN | 103022708 B | 6/2015 |
| DE | 4008395 A1 | 9/1991 |
| DE | 102011012680 B3 | 1/2012 |

OTHER PUBLICATIONS

"AN5: Millimeter-Wave Radar Subsystems," Quinstar Technology, retrieved on Feb. 6, 2017, from http://quinstar.com/application-notes/an5-millimeter-wave-radar-subsystems/, 5 pp.

"Fractional N Frequency Synthesizer Tutorial," Fractional N Synthesizer, Radio Electronics, retrieved from http://www.radioelectronics.com/info/rftechnologydesign/pllsynthesizers/fractionalnsynthesis.php, May 22, 2016, 9 pp.

"Kintex-7 FPGAs Data Sheet: DC and AC Switching Characteristics," XILINX, INC., retrieved from http://www.xilinx.com/support/documentation/data_sheets/ds182_Kintex_7_Data_Sheet.pdf on May 23, 2016, 69 pp.

(56) References Cited

OTHER PUBLICATIONS

"Radar Basics—In-phase & Quadrature Procedure," retrieved from http://Radartutorial.eu/10.processing/sp06.en.html on May 9, 2016, 1 pp.
"RO3000 High Frequency Laminates," Rogers Corporation, retrieved from https://www.rogerscorp.com/documents/722/acs/RO3000-Laminate-Data-Sheet-RO3003-RO3006-RO3010-RO3035.pdf, May 23, 2016, 4 pp.
"RO4000 Series High Frequency Circuit Materials," Data Sheet, Rogers Corporation, retrieved from https://www.rogerscorp.com/documents/726/acs/RO4000-LaminatesData-sheet.pdf, May 23, 2016, 4 pp.
"RO4350B Laminates," Rogers Corporation, retrieved from https://www.rogerscorp.com/acs/products/55/RO4350B-Laminates.aspx, May 23, 2016, 2 pp.
"RO4400 Series Bondply Data Sheet," Data Sheet, Rogers Corporation, retrieved from https://www.rogerscorp.com/documents/1850/acs/RO4400-Series-Bondply-Data-Sheet-RO4450B-and-RO4450E-Bondply.pdf, May 23, 2016, 2 pp.
"Rotorcraft Situational Awareness Radar," Rotorcraft SA, Duke University, retrieved on Feb. 6, 2017, from https://researchfunding.duke.edu/rotorcraft-situational-awareness-radar, 2 pp.
"Technical Feature: I/Q Phase Dectector O-MFA-1108," Signal Technology Corporation, retrieved from http://www.radartutorial.eu/10.processing/I+Q_phase_detector.pdf on May 9, 2016, 1 pp.
Analog Devices, 2-Channel, 500 MSPS DDS with 10-Bit DACs, AD9958, Analog Devices, Inc., http://www.analog.com/media/en/technical-documentation/data-sheets/AD9958.pdf, May 23, 2016, 44 pp.
Analog Devices, "Differential Input, Dual, Simultaneous Sampling, 4.2 MSPS, 14-Bit, SAR ADC," AD7357, Analog Devices, Inc., retrieved from http://www.analog.com/media/en/technical-documentation/data-sheets/AD7357.pdf May 23, 2016, 24 pp.
Analog Devices, "Differential Input, Dual, Simultaneous Sampling, 5 MSPS, 12-Bit, SAR ADC," AD7356, Analog Devices, Inc., retrieved from http://www.analog.com/media/en/technical-documentation/data-sheets/AD7356.pdf, May 23, 2016, 20 pp.
Analog Devices, Direct Modulation/Fast Waveform Generating, 13 Ghz, Fractional-N Frequency Synthesizer, ADF4159, Analog Devices, Inc., 2014, 36 pp.
Analog Devices, "Octal Ultrasound AFE with Digital Demodulator," AD9670, Analog Devices, Inc., retrieved from http://www.analog.com/en/products/applicationspecific/medical/ultrasound/ad9670.html#productoverview, May 20, 2016, 7 pp.
Beal, "Wi-Fi," Webopedia, retrieved from http://www.webopedia.com/TERM/W/Wi_Fi.html, May 26, 2016, 1 pp.
Deslandes et al., "Integrated Microstrip and Rectangular Waveguide in Planar Form," Microwave and Wireless Components Letters, IEEE, vol. 11 No. 2, Feb. 2001, 5 pp.
Gentile et al., "Direct Digital Synthesis Primer," DDS Primer, Analog Devices, retrieved from https://www.ieee.li/pdfviewgraphs/direct_digital_synthesis.pdf, May 2002, 50 pp.
Hittite, "Analog Devices Welcomes Hittite Microwave Corporation," Data Sheet HMC863LP4E, accessed on May 23, 2016, from http://www.analog.com/media/en/technical-documentation/data-sheets/hmc863.pdf, 10 pp.
Huang et al., "Design and Modeling of Microstrip Line to Substrate Integrated Waveguide Transitions," Electrical and Electronic Engineering, Apr. 1, 2010, 23 pp.
Kopp, "Assessing the Tikhomirov NIIP L-Band Active Electronically Steered Array," Air Power Australia Analyses, retrieved from http://www.ausairpower.net/APA200906.html, Jan. 27, 2014, 24 pp.
Kumar et al., "A Review on Substrate Integrated Waveguide and its Microstrip Interconnect," Journal of Electronics and Communication Engineering, vol. 3 Issue 5, Sep.-Oct. 2012, 5 pp.
Madadi et al., Analysis and Design of I/Q Charge-Sharing Band-Pass-Filter for Superheterodyne Receivers, Transactions on Circuits and Systems I, vol. 62 No. 8, IEEE, Aug. 2015, 8 pp.
Marki et al., "Mixer Basics Primer: A tutorial for RF & Microwave Mixers," Marki Microwave, 2010, 12 pp. (Applicant points out, in accordance with MPEP 609.04(a), that the year of publication, 2014, is sufficiently earlier than the effective U.S. filing date so that the particular month of publication is not in issue.).
Rhbanou et al., "Design of Substrate Integerated Waveguide Bandpass Filter Based on Metamaterials CSRRs," Electrical and Electronic Engineering, 2014, 10 pp. (Applicant points out, in accordance with MPEP 609.04(a), that the year of publication, 2010, is sufficiently earlier than the effective U.S. filing date, 2016, so that the particular month of publication is not in issue.).
Rowan et al., "Mixers and frequency multipliers," Chapter 7, Practical Rf Circuit Design for Modern Wireless Systems, vol. II Active Circuits and Systems, Dec. 31, 2002, 10 pp.
U.S. Appl. No. 14/488,154, by David C. Vacanti, filed Sep. 16, 2014.
U.S. Appl. No. 15/253,471, by David C. Vacanti, filed Aug. 31, 2016.
U.S. Appl. No. 15/253,494, by Nigel Wang, filed Aug. 31, 2016.
Wu, "Substrate Integrated Waveguide Antenna Applications," School of Engineering and Digital Arts, University of Kent, Aug. 2015, last modified Feb. 5, 2016, 8 pp.
Extended European Search Report and Written Opinion from counterpart European Patent Application No. 18163209.2, dated Jul. 30, 2018, 10 pp.
Response to Extended Search Report dated Jul. 30, 2018, from counterpart European Application No. 18163209.2, filed Nov. 7, 2018, 16 pp.

* cited by examiner

SIW RECEIVER ARRAY
122A

COMBINED DEGRADED VISUAL ENVIRONMENT VISION SYSTEM WITH WIDE FIELD OF REGARD HAZARDOUS FIRE DETECTION SYSTEM

TECHNICAL FIELD

The disclosure relates to FMCW radar systems.

BACKGROUND

Aircraft, and other vehicles or around stations, may be subject to attack by hostile forces. A hostile force may attack with a variety of projectiles, such as bullets, rocket-propelled grenades, and similar hazardous fire. Ground installations may have projectile detection systems, which may include the ability to return fire to an area from which the hazardous fire originates from the hostile forces. Such systems may be too large to mount on a vehicle, especially an aircraft.

SUMMARY

In general, the disclosure is directed to a hazardous fire detection system that Wray be mounted on a vehicle, such as an aircraft, to detect bullets, grenades and similar projectiles that may pose a danger to the vehicle. The system may observe a wide field-of-regard (FOR) and for each projectile, determine the range of closest approach to the host platform (i.e., a miss distance) and an approximate direction of origin. The hazardous fire detection system may include one or more FMCW radar devices that measures range, hearing and Doppler information for targets within its FOR and resolves ambiguity by estimating angular information (azimuth and elevation) for each target projectile. The system may estimate angular information by using a monopulse antenna pattern with the radar receiver.

The one or more FMCW radar devices may be mounted on the vehicle to provide a detection "bubble" around the vehicle. Because the projectiles may travel very fast, e.g. in the hundreds of meters per second, the transmit beam pattern for each FMCW radar device may have a wide angle in both azimuth and elevation to give a wide FOR and enhance detection. The one or more FMCW radar devices may be mounted on the vehicle such that the combined transmit beam patterns of the FMCW radar devices provide the detection bubble.

In one example, the disclosure is directed to a vehicular radar device, the device comprising: a radar transmit antenna, a radar receive antenna, radar transmitter electronics in signal communication with the radar transmit antenna, wherein the radar transmitter electronics, in conjunction with the radar transmit antenna, are configured to output radar signals over a three-dimensional coverage volume around the vehicle and radar receiver electronics in signal communication with the radar receive antenna, wherein the radar receiver electronics comprise digital beamforming circuitry configured to receive radar reflections from the radar receive antenna corresponding to the outputted radar signals. The device also includes one or more processors in signal communication with the radar receive electronics, and configured to determine characteristics of a path of a projectile through the three-dimensional coverage volume around the vehicle based on the radar reflections.

In another example, the disclosure is directed to a vehicle mounted radar system, the system comprising: one or more FMCW radar devices, wherein each of the one or more FMCW radar devices comprises, a radar transmit antenna, a radar receive antenna, radar transmitter electronics in signal communication with the radar transmit antenna, wherein the radar transmitter electronics, in conjunction with the radar transmit antenna, are configured to output radar signals over a three-dimensional coverage volume around the vehicle, and radar receiver electronics in signal communication with the radar receive antenna, wherein the radar receiver electronics comprise digital beamforming circuitry configured to receive radar reflections from the radar receive antenna corresponding to the outputted radar signals. The system includes one or more processors operably coupled to the one or more FMCW radar devices and configured to determine characteristics of a path of a projectile through the three-dimensional coverage volume around the vehicle based on the radar reflections.

In another example, the disclosure is directed to a method to determine the trajectory and direction of travel of a projectile through a three-dimensional coverage volume, the method comprising: receiving, by radar signal processing circuitry, a digitized radar signal reflected from the projectile entering a field of regard (FOR) of a radar system, wherein the radar signal processing circuitry is a component of the radar system, determining, by radar signal processing circuitry, a first position of the projectile within the FOR, wherein the first position comprises a first range and first bearing relative to the radar system to the projectile at a first time, determining, by radar signal processing circuitry, a second position of the projectile within the FOR. The second position: comprises a second range and second bearing relative to the radar system to the projectile at a second time, and is different than the first position of the projectile. The method further comprises determining, by radar signal processing circuitry, a bearing history of the projectile through the FOR, wherein: the hearing history comprises bearing of the projectile relative to the radar system during a period of time the projectile is within the FOR of the radar system, and the period of time comprises the first time and the second time.

The details of one or more examples of the disclosure are set forth in the accompanying drawings and the description below. Other features, objects, and advantages of the disclosure will be apparent from the description and drawings, and from the claims.

DETAILED DESCRIPTION

In general, the disclosure is directed to a hazardous fire detection system that may be mounted on a vehicle, such as an aircraft, to detect bullets, grenades and similar projectiles that may pose a danger to the vehicle. The system may observe a wide field-of-regard (FOR) and for each projectile, determine the range of closest approach to the host platform (i.e., a miss distance) and an approximate direction of origin. Each frequency modulated continuous wave (FMCW) radar device of the hazardous fire detection system may measure range and Doppler information for targets within its FOR and resolves ambiguity, such as Doppler ambiguity, by estimating angular information (azimuth and elevation) for each target projectile. The hazardous fire detection system, which may also be referred to as simply "radar system" may estimate angular information by using a monopulse antenna pattern with the radar receiver.

The one or more FMCW radar devices may be mounted on the vehicle to provide a detection "bubble" around the vehicle. Because the projectiles may travel very fast, e.g. in the hundreds of meters per second, the transmit beam pattern for each FMCW radar device may have a wide angle in both azimuth and elevation to give a wide FOR and enhance detection. The one or more FMCW radar devices may be mounted on the vehicle such that the combined transmit beam patterns of the FMCW radar devices provide the detection bubble.

In a simplified two-dimensional case, each approximately straight-line target trajectory can be defined by the point of entry (range and azimuth) into the radar FOR, as well as the point of closest approach to the radar (range and azimuth). The point of closest approach is the point along the trajectory where the trajectory is perpendicular to the line-of-sight from the radar to the target. This point thus occurs when the range from the radar to the target is at its minimum value, and also where the Doppler frequency of the target is zero. Because of the constraint that the target trajectory is perpendicular to the line-of-sight to the target at this point (i.e. the trajectory is tangent to the arc swept out by the range of closest approach), the trajectory can be unambiguously defined in two dimensions by determining, for example, the range and azimuth of the target at the point of closest approach. Other examples of determining trajectory in both two dimensions (2D) and three dimensions (3D) will be discussed in more detail below. The radar system may estimate both the miss distance (range of closest approach) and the angle of the incoming hostile fire by determining both trajectory and the direction of travel. The radar system may determine direction of travel along the trajectory with additional information such as the target range, azimuth, or Doppler over time.

Figure 1:
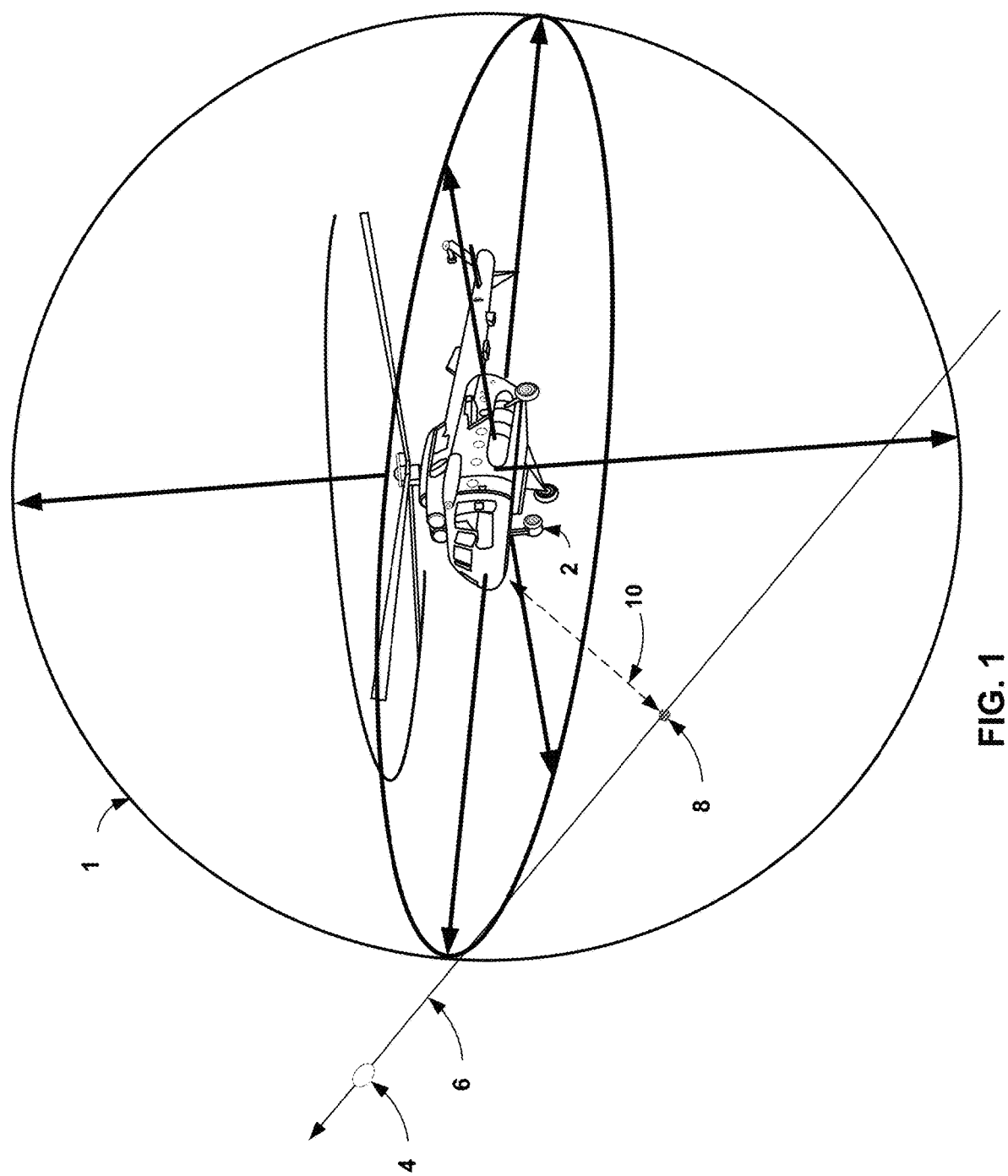
FIG. 1 is a conceptual diagram illustrating a three-dimensional coverage volume around a vehicle provided by a radar system in accordance with one or more techniques of this disclosure.

FIG. 1 is a conceptual diagram illustrating a three-dimensional coverage volume around a vehicle provided by a radar system in accordance with one or more techniques of this disclosure. The vehicle in this example is a helicopter 2, although the techniques of this disclosure are not limited to any particular type of vehicle. Helicopter 2 may include one or more FMCW radar devices that are components of a vehicle mounted radar system. The FMCW radar devices may also be referred to as vehicular radar devices. The radar system is small and lightweight enough to be mounted on aircraft. The radar system has a wide FOR 1 to provide a 3D coverage volume, or detection bubble around helicopter 2 for detecting projectiles, such as projectile 4 that may pose a threat to helicopter 2. The radar system may determine one or more characteristics of the path of projectile 4 as projectile 4 passes through FOR 1. Some examples of characteristics may include the miss range 10, position of a closest point of approach 8 of projectile 4 relative to the vehicle, a direction of travel of projectile 4, and a trajectory 6 of projectile 4.

Figure 2:
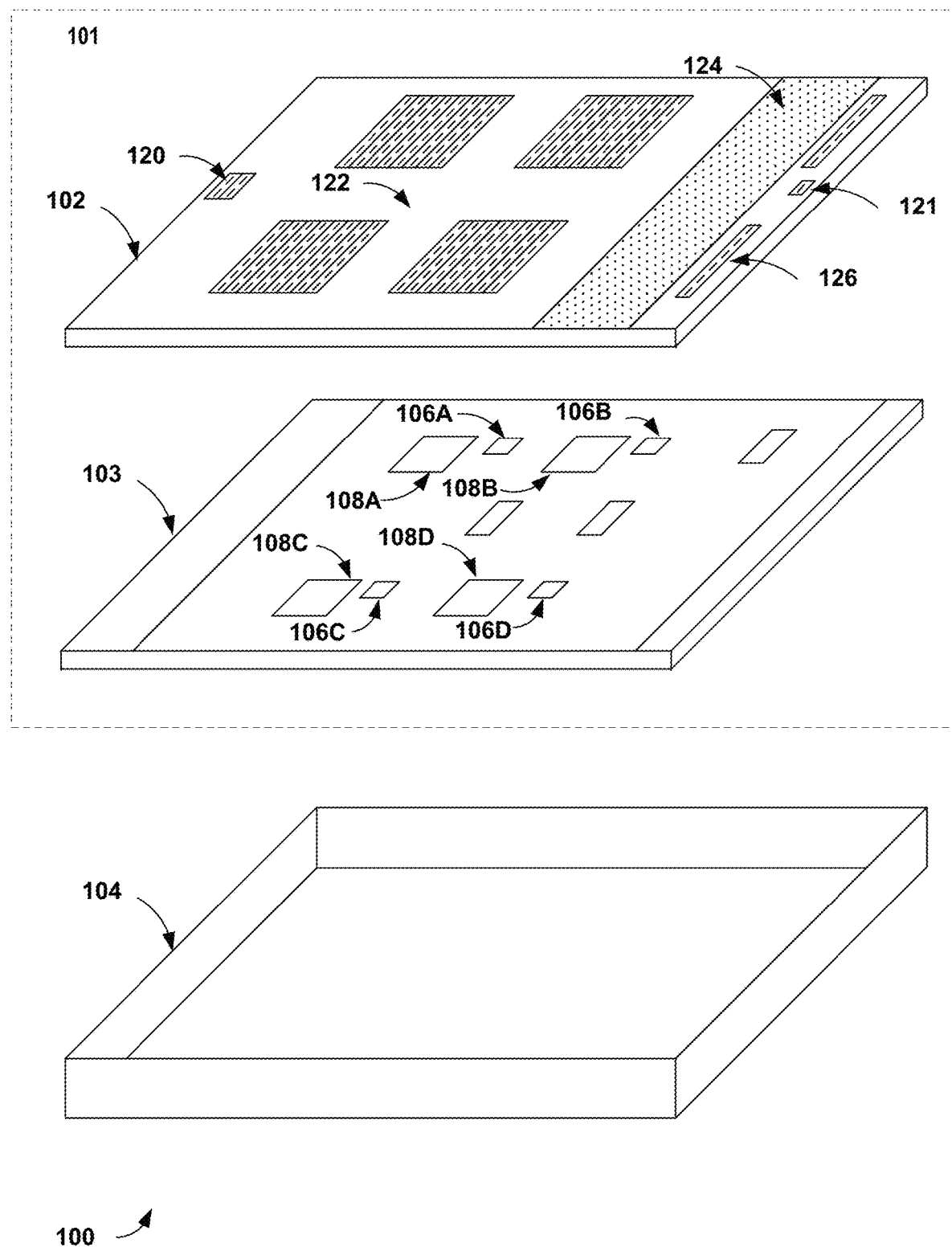
FIG. 2 is a conceptual and assembly diagram illustrating an exploded view of an example integrated FMCW radar device, which may be a component of a vehicle mounted system in accordance with one or more techniques of this disclosure.

FIG. 2 is a conceptual and assembly diagram illustrating an exploded view of an example integrated FMCW radar device, which may be a component of a vehicle mounted system in accordance with one or more techniques of this disclosure. FIG. 2 illustrates an example integrated FMCW radar device 100 which may include a substrate integrated waveguide (SIW) antenna and a protective housing 104. In some examples, the SIW antenna may be described as a digital active phased array (DAPA) radar antenna.

In the example of FIG. 2, the integrated radar system is implemented as a multi-layer printed circuit board (PCB) 101 that includes an SIW antenna layer 102 and one or more circuit layers 103. Circuit layers 103 may include receiver chips 108A 108D, analog-to-digital (A/D) converters 106A-106D as well as other circuit elements. An analog-to-digital converter may also be called an "ADC." In other examples, FMCW radar device 100 may include one or more additional PCBs that house some of the components shown on circuit layer 103 as well as additional components not shown in FIG. 2.

The projectile detection features, a.k.a hazardous fire detection, of FMCW radar device 100, which include four-element receive antenna 120 and single element transmit antenna 121, may take advantage of the structural and processing capabilities of FMCW radar device 100. Transmit antenna 121 may provide a wide FOR radar transmit beam. The radar transmitter electronics that are part of FMCW radar device 100 are in signal communication with the slotted waveguide radar transmit antennae, including transmit antenna 121 and transmit antenna 126. The radar transmitter electronics, in conjunction with the slotted waveguide radar transmit antenna 121, are configured to output radar signals over a three-dimensional coverage volume around the vehicle. FMCW radar device 100 may be configured to provide additional features in conjunction with transmit antenna 126, such as unmanned aerial vehicle (UAV) detection, helicopter bumper for degraded visual environment (DVE), terrain following radar, and other features.

The four-element receive antenna 120 may act as a four-element monopulse receive antenna to provide the hazardous fire detection features of FMCW radar device 100. The radar receiver electronics within FMCW radar device 100 are in signal communication with the slotted waveguide radar receive antennae including both receive antenna 120 and receive antenna array 122. The radar receiver electronics may include digital beamforming circuitry configured to receive from radar receive antenna 120 radar reflections corresponding to the outputted radar signals and configured to output monopulse beam signals to signal processing circuitry within FMCW radar device 100. The signal processing circuitry may include one or more processors configured to determine characteristics of a path of a projectile, such as projectile 4 through the three-dimensional coverage volume around the vehicle, such as FOR 1. The radar receiver electronics, in conjunction with radar receive antenna array 122, may provide additional features, such as those discussed above in relation to transmit antenna 126. The four-element receive antenna 120 is just one example implementation for hazardous fire detection features. In other examples, receive antenna 120 may include more receive elements or fewer receive elements. The monopulse antenna pattern from receive antenna 120 provides both azimuth and elevation estimates, and therefore may provide a bearing history that includes both azimuth and/or elevation histories of the projectile.

Multi-layer PCB 101 may include circuits and components that implement radar transmitter electronics, radar receiver electronics, one or more processors, communication electronics, power conditioning, and distribution, clock/timers and other circuitry and components. The one or more processors may be configured to control the radar transmitter electronics and radar receiver electronics as well as process and identify radar targets and send notifications and information to users using the communication electronics. A processor may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

SIW antenna layer 102 may be electrically connected to circuit paths and components on one or more circuit layers 103, or additional PCBs not shown in FIG. 2. In some examples, plated vias may provide connections between one or more circuit layers 103, as well as to SIW antenna layer 102. A via may be a plated or unplated hole that may be drilled, etched or otherwise formed between layers of multi-layer PCB 101. A plated via may be plated with a conductive material to electrically connect layers. Some examples of conductive material may include copper, solder, conductive epoxy or other materials.

Housing 104 may cover and provide structural support for example FMCW radar device 100. Housing 104 may be a molded plastic, stamped or formed sheet metal or other suitable material. Housing 104 may include a conductive coating in one or more areas to provide shielding for electromagnetic interference (EMI). Housing 104 may include penetrations for power, communication or other connections as well as be configured to securely mount FMCW radar device 100.

In operation, FMCW radar device 100 may provide digital electronic beam steering on received radar reflections by using, in part, phase shift commands within the components on one or more circuit layers 103. The radar transmitter electronics, in signal communication with the radar transmit antenna, are configured to output, e.g., transmit, radar signals that are a fixed, or optionally scanned, wide beam illumination in one plane. For the hazardous fire detection features, FMCW radar device 100 may include fixed monopulse receive beams for receive antenna 120. This will be described in more detail in relation to FIG. 3A below. The digital electronic beamforming at baseband frequencies provides advantages including reduced cost and complexity because of fewer radio frequency (RF) components, reduced shielding and electromagnetic interference (EMI) requirements, smaller size and weight, and reduced power consumption.

An FMCW radar device operating according to the techniques of this disclosure may provide advantages over other techniques. For example, an electronic beam scanning feature of FMCW radar device 100 may be wholly separate and used for separate functions from the monopulse pattern feature of antenna 120. Both features provide estimates of angular information for targets. However, electronic beam scanning requires a "dwell" time at each beam angle of interest which must comprise at least one radar pulse or FMCW frame period. Electronic beam scanning is therefore not as desirable for the hazardous fire detection features of FMCW radar device 100, because it would not be able to observe the full FOR simultaneously. With electronic beam scanning, the fast-moving projectile targets could pass through unnoticed. Alternatively, the monopulse antenna pattern allows angular estimates to be made while observing the fill FOR on each radar pulse or FMCW frame period.

In one example, FMCW radar device 100 may use a heterodyne FMCW radar with a 16 MHz first intermediate frequency (IF) before down conversion to a baseband between 1 KHz and 2 MHz. FMCW radar device 100 may apply the 16 MHz offset using a dual direct digital synthesis (DDS) at the transmit array. A heterodyne system may provide advantages over other FMCW radars that use a homodyne receiver to directly convert RF signals to baseband near zero frequency. FMCW radar device 100 may include components with a passband that includes 16 MHz. These components may also provide simultaneous down conversion to baseband, I/Q channel formation and four-bit phase shift.

By using multi-function components along with frequency down conversion, in some examples to ultrasonic frequencies, FMCW radar device 100 may provide advantages over a standard homodyne receiver, even if the homodyne receiver used an I/Q mixer on receive. In this way, FMCW radar device 100 may achieve performance advantages. A few examples include I/Q accuracy (true 90-degree offset), four-bit phase shift, fine range and elevation resolution, low receiver bandwidth, low data rates, small size, light weight, low power consumption, integrated package and easy retrofit of existing platforms.

For the hazardous fire detection features of FMCW radar device 100, the one or more processors may determine one or more characteristics of the projectile's path, such as miss distance and angle of origin, by determining a range history, bearing history and/or Doppler history of projectile 4 through the three-dimensional coverage volume of FOR 1 around the helicopter 2. The bearing may also be considered angular information, which includes both azimuth and elevation of projectile 4 relative to FMCW radar device 100. The bearing history may include the azimuth and elevation over time as projectile 4 moves through FOR 1. Bearing history may also be referred to as angular history in this disclosure. Both bearing history and angular history include azimuth history and elevation history, unless otherwise noted.

One characteristic of the projectile's path is the projectile's trajectory 6, as shown in FIG. 1. In 2D, each projectile (or target) straight-line trajectory can be defined by the point of entry (range and azimuth) into the radar FOR, as well as the point of closest approach S to the radar (range and azimuth). The point of closest approach is the point along the trajectory where the trajectory is perpendicular to the line-of-sight from the radar to the target. This point thus occurs when the range from the radar to the target is at its minimum value, and also where the Doppler frequency of the target is zero. This minimum range may also be called the miss distance 10, as described above. Because of the constraint that the target trajectory is perpendicular to the line-of-sight to the target at the closest point of approach point 8 (i.e, the trajectory is tangent to the arc swept out by the range of closest approach or miss distance 10), the trajectory can be unambiguously defined in two dimensions by one of the following sets of information:

a. Range and azimuth of the target at the point of closest approach;

b. Range and azimuth of the target at any two distinct points along the trajectory;

c. Range of closest approach; and at least two of range, azimuth, or Doppler of the target at any other single point along the trajectory.

The list of measurements above is not exhaustive. There are many ways to fully define the straight-line trajectories in two dimensions. The definition given above may have advantages over other approaches because this definition provides immediate insight into how the parameters of interest of the trajectory (namely the miss distance and angle of origin) may be estimated if the FMCW radar device determines the straight-line trajectory. An assumption that a target projectile follows a straight-line trajectory through the radar FOR is reasonable because of how quickly the projectiles move and how limited the range extent of the FOR is for the hazardous fire detection (HFD) feature.

Note that these sets of information may define the target's trajectory through the radar FOR, but may not define the projectile's direction of travel along the trajectory. FMCW radar device 100 may determine the direction of travel inspection of the target range, azimuth, or Doppler over time. Certain trajectories may require azimuth to resolve direction of travel, which will be discussed in more detail in relation to FIGS. 5-10 below. By unambiguously determining both the trajectory and the direction of travel, FMCW radar device 100 may determine the miss distance 10 (range of closest approach) and the angle of the incoming hostile fire. The angle of incoming fire may include some uncertainty as discussed above in relation to FIG. 1. Some uncertainty with the trajectory parameters may generally be true because of measurement uncertainties, regardless of how the trajectory is determined. FMCW radar device 100 may estimate the parameters of interest of the trajectory to within a desired level of uncertainty (i.e. with a certain small cone angle) without requiring that enough measurements are made to unambiguously define the full trajectory. In this manner, FMCW radar device 100 may provide sufficient information to the vehicle operator in sufficient time for the vehicle operator to respond to a threat.

In some examples, the one or more processors may be further configured to generate an output, which may include notification of the projectile passing through the three-dimensional coverage volume around the vehicle. This may be an alarm, such as a tone, voice warning, visual warning or similar notification to the vehicle operator, such as the helicopter flight crew. In some examples, the processors of the radar system may also notify other crew members, which may include crew members operating weapons, such as a door gunner or similar crew member.

Similarly, the one or more processors may be further configured to generate an output including characteristics of the path of the projectile through the three-dimensional coverage volume around the vehicle. This may include outputting information for display on a display device such as the closest point of approach 8, miss distance 10, approximate trajectory and direction of travel. In some examples, the radar range resolution of FMCW radar device 100 for the path of the projectile may be less than 1 meter and the radar angular resolution may be approximately 0.8 to 1.6 degrees.

Figure 3A:
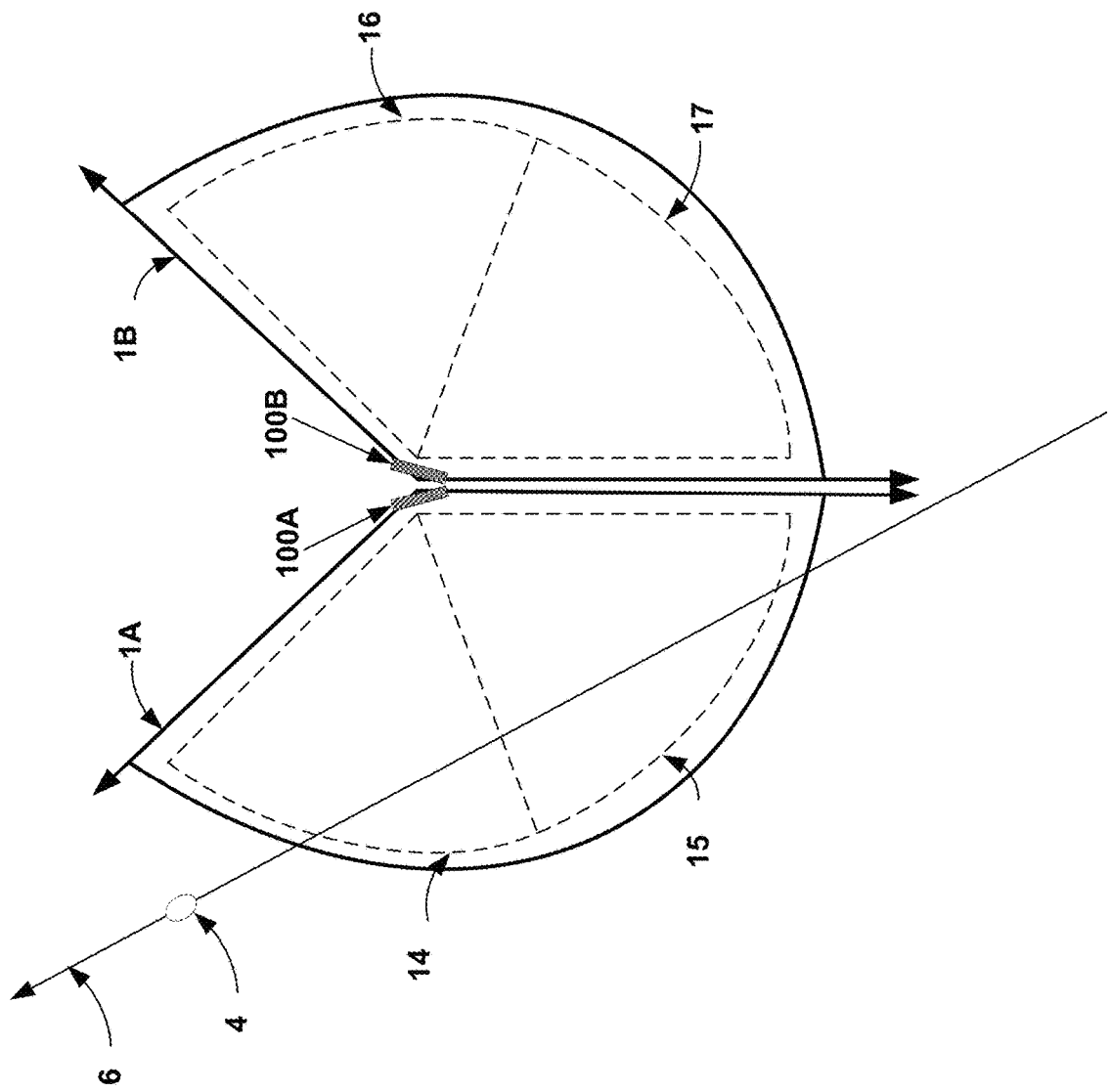
FIG. 3A is a conceptual diagram illustrating an example radar system, which may include one or more FMCW radar devices to provide a three-dimensional coverage volume around the vehicle.

FIG. 3A is a conceptual diagram illustrating an example radar system, which may include one or more FMCW radar devices to provide a three-dimensional coverage volume around the vehicle. FIG. 3A depicts a 2D view of a portion of FOR 1, as depicted in FIG. 1.

The radar system of FIG. 3A may be mounted on a vehicle such as helicopter 2, shown in FIG. 1. For example, FMCW radar devices 100A and 100B may be mounted on the right and left sides of the tail boom of helicopter 2. Helicopter 2 may include additional FMCW radar devices to complete the 3D coverage volume around the vehicle, for example an additional FMCW radar device mounted near the nose of helicopter 2.

FMCW radar device 100A may generate FOR 1A, while FMCW radar device 100B may generate FOR 1B. The example of FIG. 3A depicts FORs 1A and 1B that cover approximately 135 degrees of elevation. In other examples the FOR may cover more or less of an angular elevation. For clarity in FIG. 3A, FOR 1A and FOR 1B do not overlap, but in some examples portions of FOR 1A may overlap with the FOR of other FMCW radar devices that are part of the hazardous fire detection radar system on helicopter 2.

FMCW radar device 100A may include monopulse receive beams 14 and 15, while FMCW radar device 100B may include monopulse receive beams 16 and 17. The monopulse receive beams may correspond to the elements of receive antenna 120 depicted in FIG. 2. In the example of a four-element receive antenna, a respective FOR for a respective FMCW radar device may include four monopulse receive beams that cover the FOR for the respective FMCW radar device. For example, FMCW radar device 100A may include two additional monopulse receive beams (not shown in FIG. 3A) along with monopulse receive beams 14 and 15. The additional monopulse receive beams may extend into or out of the page, in the example of FIG. 3A. The monopulse antenna pattern from receive antenna 120 provides both azimuth and elevation estimates, and therefore may provide a bearing history that includes both azimuth and/or elevation histories of the projectile.

FIG. 3A depicts monopulse receive beams 14-16 as not overlapping each other and as not covering the entire FOR for clarity only. In most examples, the monopulse receive beams would cover the entire FOR for each respective FMCW radar device. In some examples the monopulse receive beams may also overlap each other.

Similar to the 2D discussion above, in three dimensions, each straight-line target trajectory can be defined, for example, by the point of entry (range, azimuth, and elevation) into the radar FOR, as well as the point of closest approach to the radar (range, azimuth, and elevation). For both the 2D and 3D analysis, an FMCW radar device may perform calculations based on an azimuth and elevation relative to the plane of the antennae of the FMCW device, not the coordinate system of the vehicle, such as helicopter 2. Each FMCW device may perform calculations on range relative to the position of the FMCW radar device. In the example of FIG. 3A. FMCW radar devices 100A and 100B may each perform calculations based on the azimuth, elevation, range of a target projectile relative to each FMCW radar device. The radar system, such as radar system 5 depicted in FIG. 3B, may receive outputs from each FMCW radar device and translate the target projectile position as relative to the coordinate system of the vehicle.

However, in 3D case knowing the range, azimuth, and elevation of the point of closest approach may not be sufficient to unambiguously define the target trajectory. In 3D, the point of closest approach may define a plane, which contains the trajectory. The plane is tangent to a spherical shell swept out by the range of closest approach. Therefore, the projectile's trajectory 6 can be unambiguously defined in three dimensions, for example by one of the following sets of information, which are not exhaustive:

a. Range, azimuth, and elevation of the target at any two distinct points along the trajectory;

b. range, azimuth, and elevation of the target at the point of closest approach; and azimuth and at least one of range, elevation, or Doppler of the target at any other single point along the trajectory.

Other combinations of measurable characteristics or parameters of the projectiles path may be sufficient to define the trajectory, but these two cases may have advantages over other approaches because of lower complexity and reduced calculations. As with the 2D discussion above, these sets of information may define the target's trajectory through the radar FOR, but may not define the projectile's direction of travel. Once the trajectory is known, the direction of travel may be determined by inspection of the target range, azimuth, elevation, or Doppler over time. Certain trajectories may require azimuth and/or elevation rather than Doppler history to resolve. For example, in the 3D case the point of closest approach of a target projectile may occur at an elevation of 90° (directly above the FMCW radar device). In this case, every possible trajectory in the tangent plane can have identical Doppler vs. time plots (i.e. Doppler history) as well as identical range vs. time plot (i.e. range history). The FMCW radar device may resolve the trajectory in this case can using angular information, for example by using azimuth at an additional point along the target projectile trajectory. Examples of Doppler history and range history are depicted below in FIGS. 5-9.

In operation, the monopulse receive beams provide angular and range information for the path of projectile 4, such as the projectiles trajectory 6. Additionally, by inspecting the range, bearing and Doppler history of projectile 4, the radar system may resolve ambiguities between possible trajectories as well as determine a direction of travel. For example, projectile 4 would pass first through monopulse receive beam 15 and at a later time through monopulse receive beam 14, By inspecting this angular history of projectile 4, FMCW radar device 100A may determine the direction of travel of projectile 4. Also, as described above, FMCW radar device 100A may determine the closest point of approach and miss distance by determining, for example, where the Doppler frequency is zero.

Ambiguities between possible trajectories of target projectiles may arise from attempting to determine the trajectory based on limited information such as range and Doppler. In this manner, the radar system may efficiently determine enough information about the target projectile to quickly output this information to a vehicle operator, such as the pilot or weapons operator of helicopter 2. Range and Doppler measurements are "limited" because they provide scalar estimates of vector quantities, e.g. position and velocity. The FMCW radar device may estimate the parameters of the trajectory using the least information possible, rather than actually tracking each projectile in azimuth, elevation, and range as it passes through the FOR. To resolve ambiguity from the scalar estimates, the FMCW radar device may use some angular information. In the example of FIG. 3A, the parameters of the projectiles trajectory that may be output to the vehicle operator may include miss distance and angle of origin.

Figure 3B:
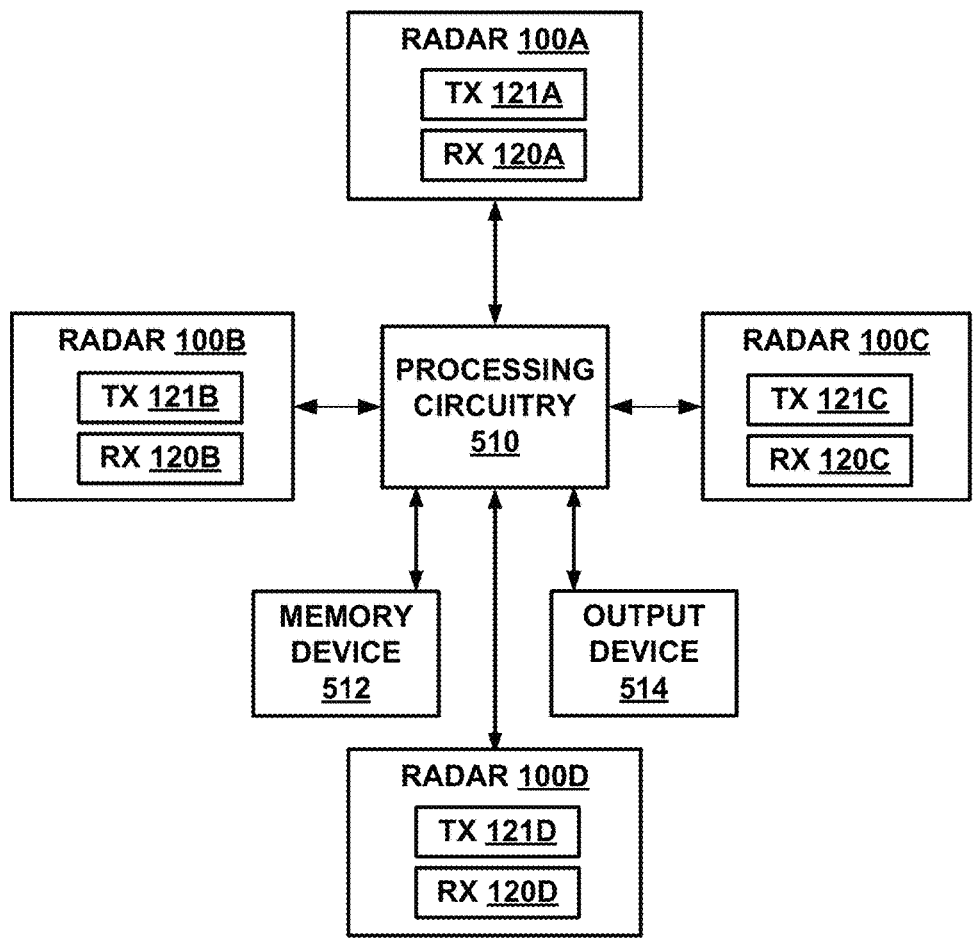
FIG. 3B is a conceptual block diagram illustrating an example radar system with one or more FMCW radar devices that provides a three-dimensional coverage volume around the vehicle.

FIG. 3B is a conceptual block diagram of an example radar system, which may include one or more FMCW radar devices to provide a three-dimensional coverage volume around the vehicle. The example radar system 5, may include one or more FMCW radar devices 100A-100D to provide the three-dimensional coverage volume. The FMCW radar devices 100A-100D correlate to the FMCW radar devices depicted in FIGS. 2 and 3A.

Radar system 5 may be mounted on a vehicle, such as helicopter 2 depicted in FIG. 1, Radar system 5 may include one or more FMCW radar devices 100A-100C. Each of the one or more FMCW radar devices may include a radar transmit antenna (121A-121B) and a radar receive antenna (120A-120D), such as radar transmit antenna 121 and a radar receive antenna 120 depicted in FIG. 2. Each FMCW radar device may include radar transmitter electronics in signal communication with the radar transmit antenna, with the radar transmitter electronics, in conjunction with the radar transmit antenna, configured to output radar signals over a three-dimensional coverage volume around the vehicle, such as the volume depicted in FIGS. 1 and 3A.

Each FMCW radar device 100A-100C may also include radar receiver electronics in signal communication with the radar receive antennae 120A-120D, with the radar receiver electronics may include digital beamforming circuitry configured to receive radar reflections from the radar receive antenna corresponding to the outputted radar signals from the radar transmit antennae 121A-121D.

Radar system 5 may also include one or more processors operably coupled to the one or more FMCW radar devices and configured to determine characteristics of a path of a projectile, such as projectile 4, through the three-dimensional coverage volume around the vehicle based on the radar reflections received by the radar receive antennae. The example of FIG. 5 depicts processing circuitry 510 as external to each FMCW radar device, however, in some examples one or more FMCW radar device may include the processing circuitry 510, which includes the one or more processors. In some examples processing circuitry 510 may be in addition to processing circuitry within each FMCW radar device 100A-100D.

Processing circuitry 510 may receive signals from each FMCW radar device and coordinate and process the signals to form a coherent picture of the three-dimensional volume around the vehicle. In addition, or as an alternative to the processing done by each FMCW radar device, processing circuitry 510 may also receive monopulse beam signals from the digital beamforming circuitry and resolve one or more ambiguities in the characteristics of the path of the projectile by comparing the monopulse beam signal to the characteristics of the path. This will be described in more detail below in relation to FIGS. 5-9.

Radar system 5 may also include one or more memory devices 512. In some examples memory device 512 may be a medium that can be used to store desired program code in the form of instructions or data structures that can be accessed by processing circuitry 510.

Radar system 5 may include one or more output devices 514. Output device 514 may include an alarm, display or similar device that may receive an output generated by processing circuitry 510. In some examples output device 514 may generate an output including notification of the projectile passing through the three-dimensional coverage volume around the vehicle. In other examples, output device 514 may include a display unit, or display other characteristics of the path of the projectile. The characteristics of the path of the projectile through the three-dimensional coverage volume around the vehicle may include one or more of a miss range, a position of a closest point of approach of the projectile relative to the vehicle, a direction of travel of the projectile, and a trajectory of the projectile, as described above. Miss range and miss distance may be used interchangeably in this disclosure.

Figure 4:
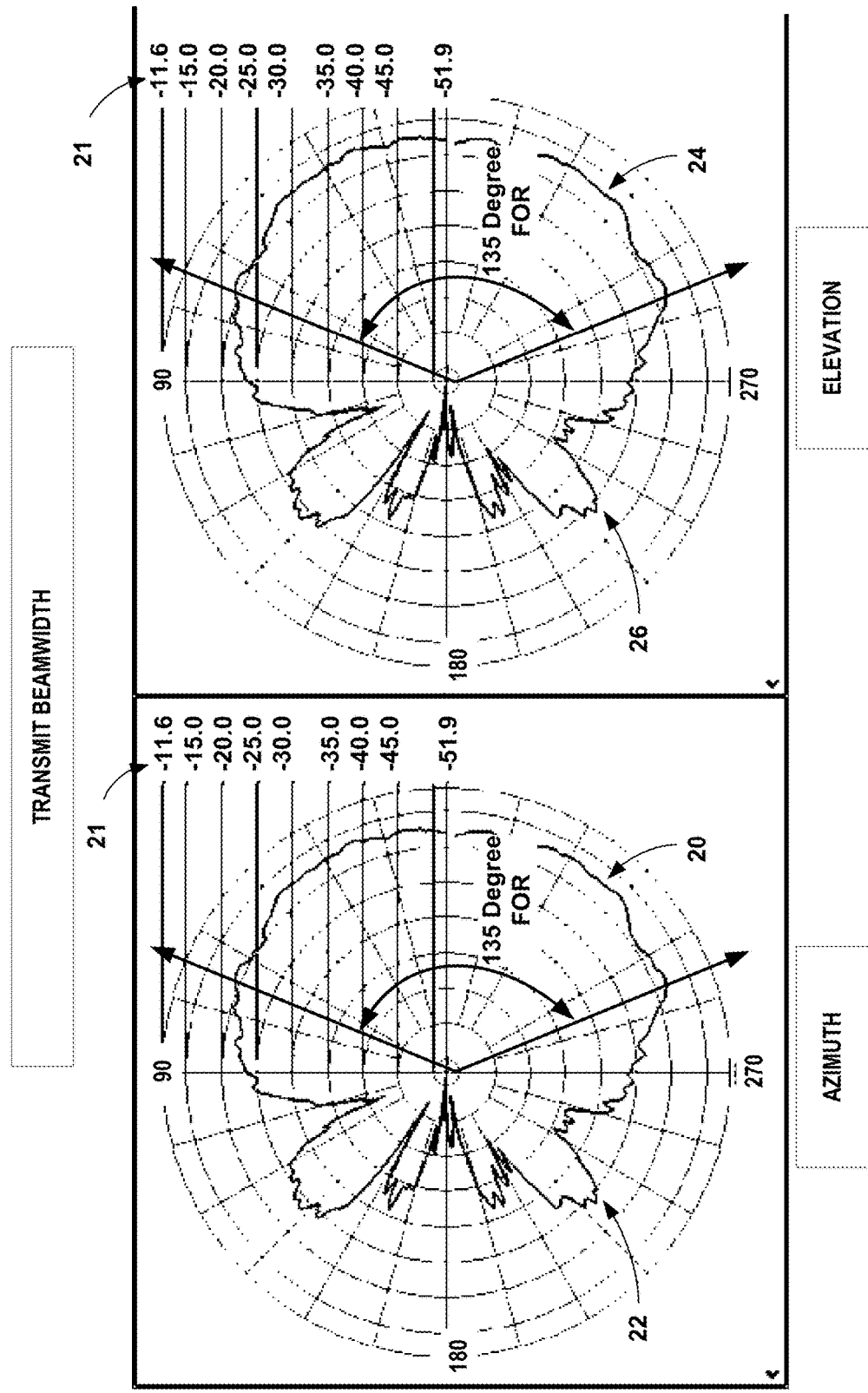
FIG. 4 is a graph depicting an example transmit beam of an FMCW radar device.

FIG. 4 is a graph depicting an example transmit beam of an FMCW radar device, such as FMCW radar devices 100-100B depicted in FIGS. 2-3. The combined azimuth and elevation transmit beamwidth may provide a 3D coverage volume around a vehicle. As discussed in relation to FIG. 3A, one or more FMCW radar devices may be mounted to a vehicle to provide complete hazardous fire detection coverage.

The radar transmitter electronics in signal communication with the radar transmit antenna, such as transmit antenna 121, output the radar signals over the FOR. The main transmission beam, shown by 20 for azimuth and 24 for elevation provide an FOR of approximately 135 degrees in both azimuth and elevation, in the example of FIG. 4. The transmission beams may also include rear and side lobes, indicated by 22 and 26. The transmitted radar signal from radar transmit antenna 121 may reflect from a target projectile within the FOR and be received by receive antenna 120.

The numbers 21 on these plots represent the gain of the antenna pattern at each angular point, which may be the example in decibels (dB) or decibels isotropic (dBi). Each grid circle indicated by a number represents a constant gain value. The grid lines show that the antenna gain for the FMCW radar device according to this disclosure is nearly constant over a wide beamwidth (the 135° FOR) in both azimuth and elevation.

FIGS. 5-10 show several scenarios in two dimensions for the hazardous fire detection radar system. FIGS. 5-10 illustrate some of the ambiguities that arise from range and Doppler information alone, and how they may be resolved using angular measurements. The range and Doppler information shown in FIGS. 5-10 is based solely on the geometry of the scenarios and not on the measurement capabilities of the radar system. In the examples below, each target projectile is assumed to have a speed of 200 m/s, and the radar's center frequency is 24.125 GHz.

Figure 5A:
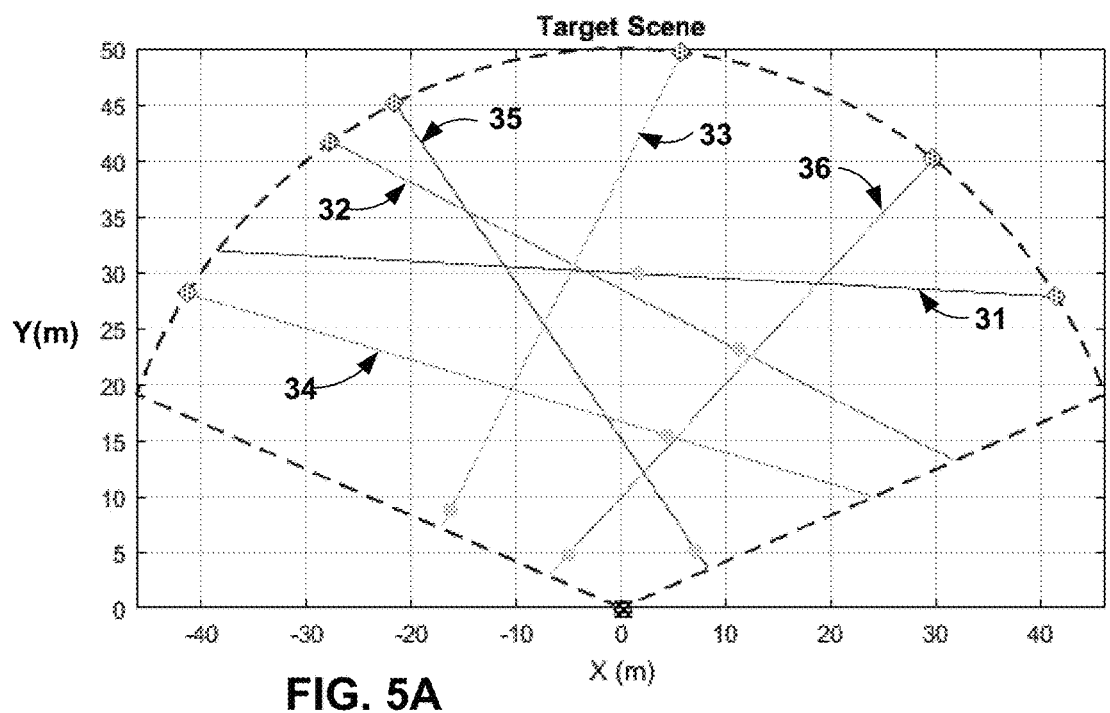
FIG. 5A is a graph depicting six randomly generated point target trajectories through an FOR of an example FMCW radar device.

FIG. 5A is a graph depicting six randomly generated point target trajectories through an FOR of an example FMCW radar device. FIG. 5A depicts target projectile trajectories 31-36. Each trajectory includes a target FOR entry point and a target closest approach point relative to the radar location. Continuing the examples of FIGS. 3-4, the radar FOR is shown as approximately 135 degrees. The phrases closest approach point and point of closest approach may be used interchangeably in this disclosure.

Figure 5B:
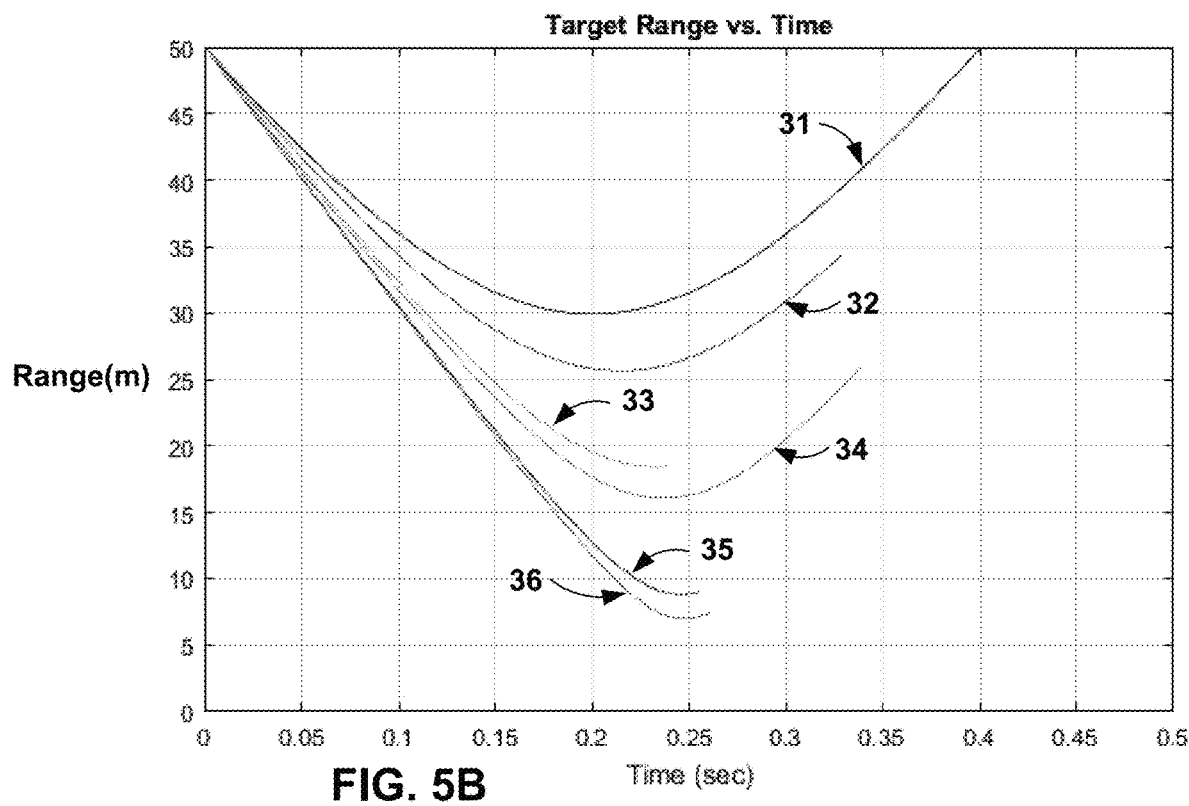
FIG. 5B is a graph that depicts the target projectile range over time, or range history for example projectile trajectories.

FIG. 5B is a graph that depicts the target projectile range over time, or range history, for projectile trajectories 31-36. Simply considering range history may result in some ambiguity. For example, trajectories 35 and 36 look similar to each other when viewed as only in range over time (i.e. range history), but the trajectories enter at opposite sides of the FOR and travel in nearly opposite directions. Comparing the bearing history of the two trajectories may unambiguously distinguish trajectory 35 from 36.

Figure 5C:
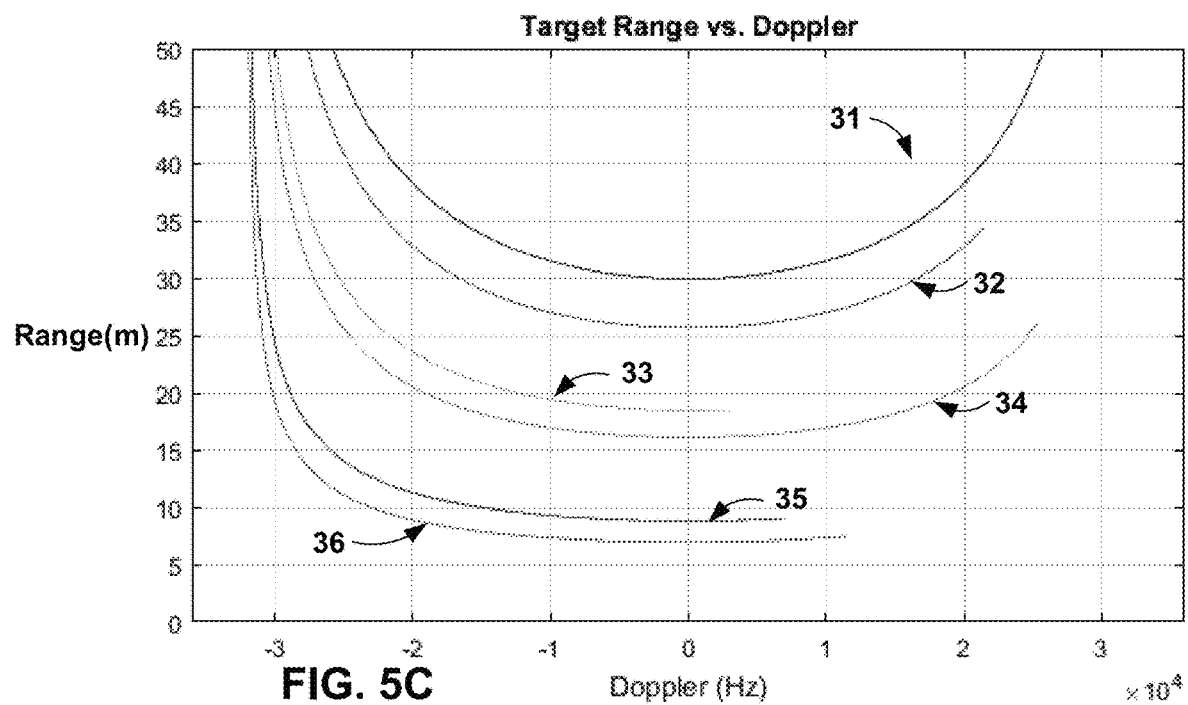
FIG. 5C is a graph that depicts the target projectile range over the Doppler frequency shift for each of the six trajectories depicted by FIG. 5A.
Figure 5D:
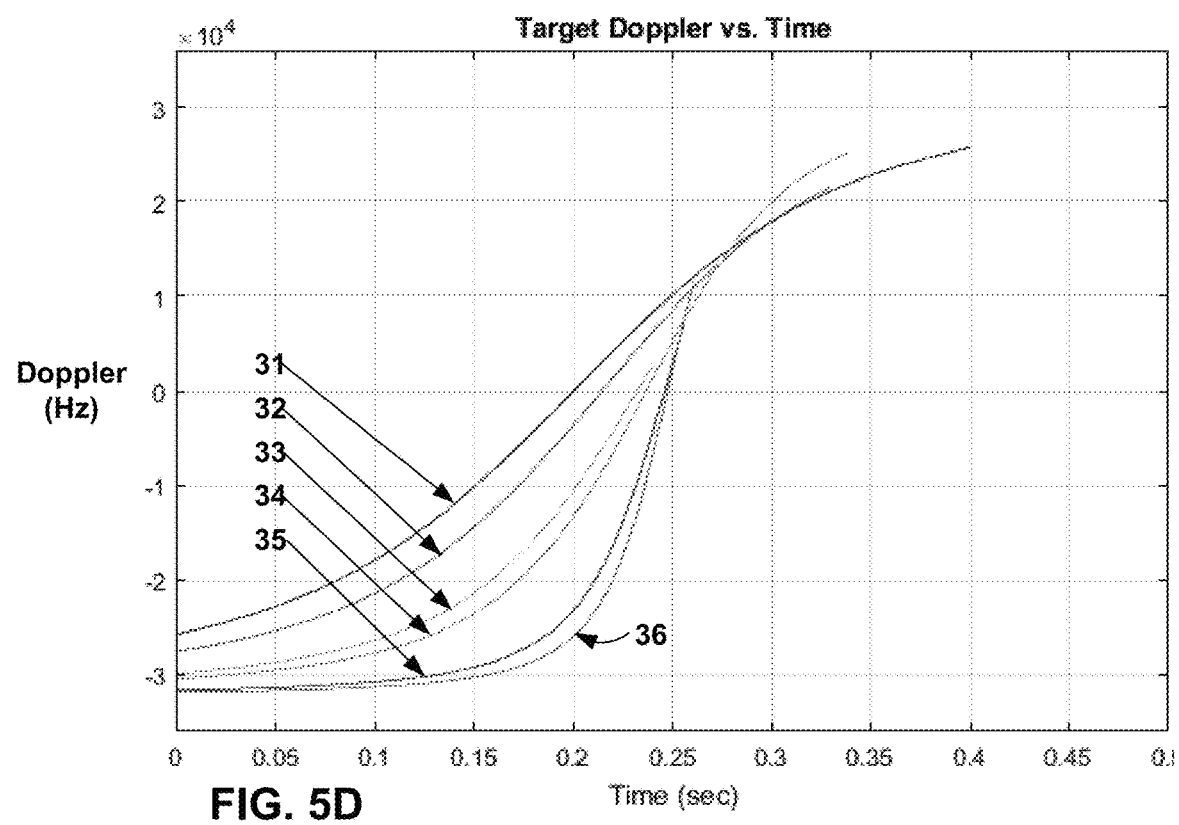
FIG. 5D is a graph that depicts the target Doppler history for each trajectory in FIG. 5A.

FIG. 5C is a graph that depicts the target projectile range over the Doppler frequency shift for each of the six trajectories depicted by FIG. 5A. FIG. 5D is a graph that depicts the target Doppler history for each trajectory in FIG. 5A.

Figure 6A:
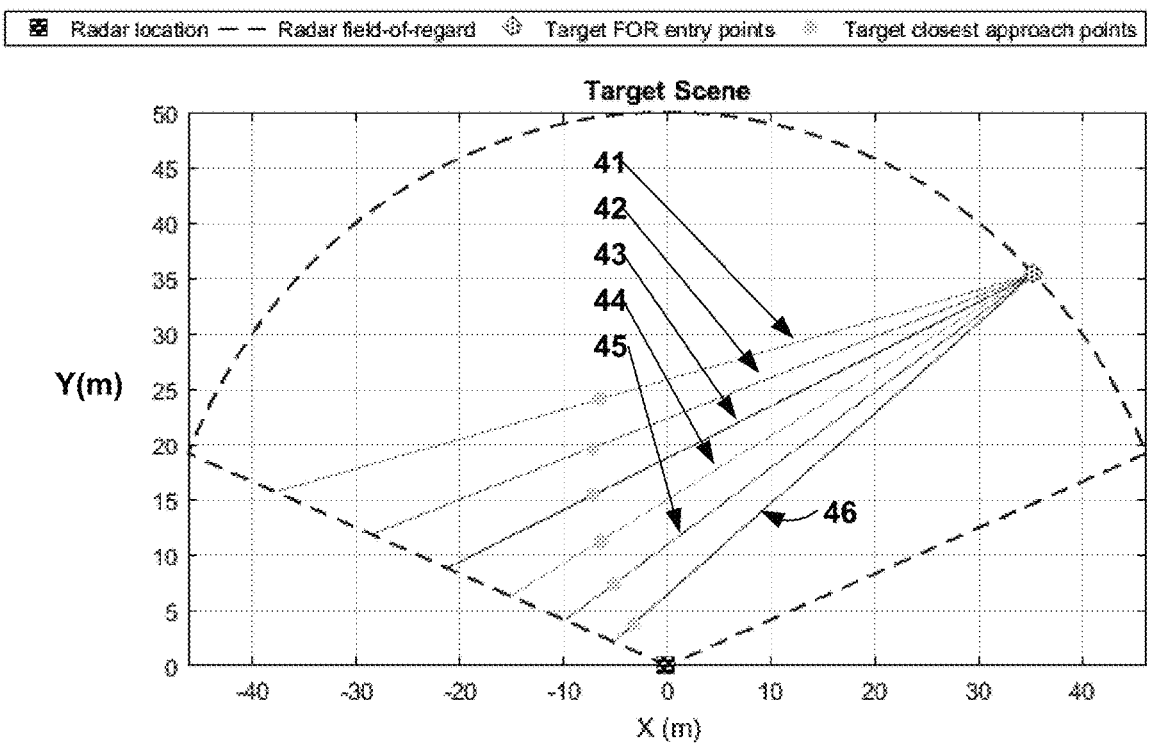
FIG. 6A is a graph depicting point-target trajectories originating from an azimuth of 45° with different miss distances relative to the radar location.
Figure 6B:
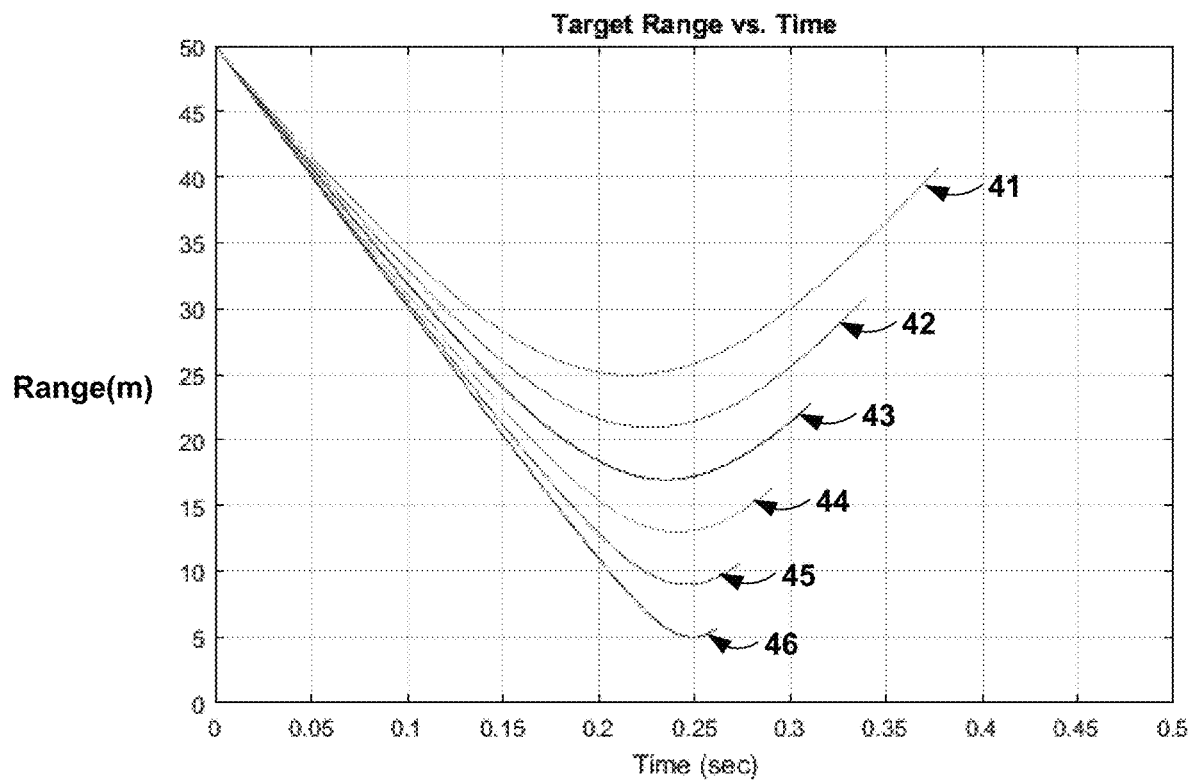
FIGS. 6B-6D depict, respectively target projectile range history, target projectile range vs. Doppler frequency shift and target projectile Doppler history.
Figure 6C:
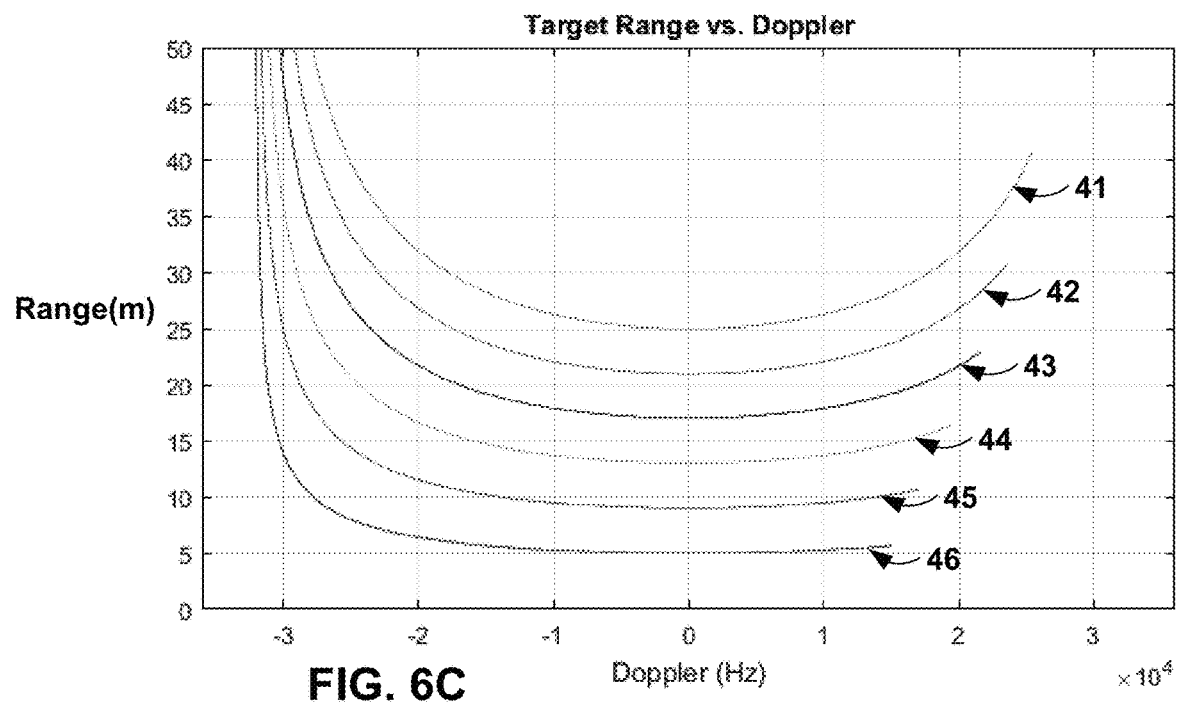
Figure 6D:
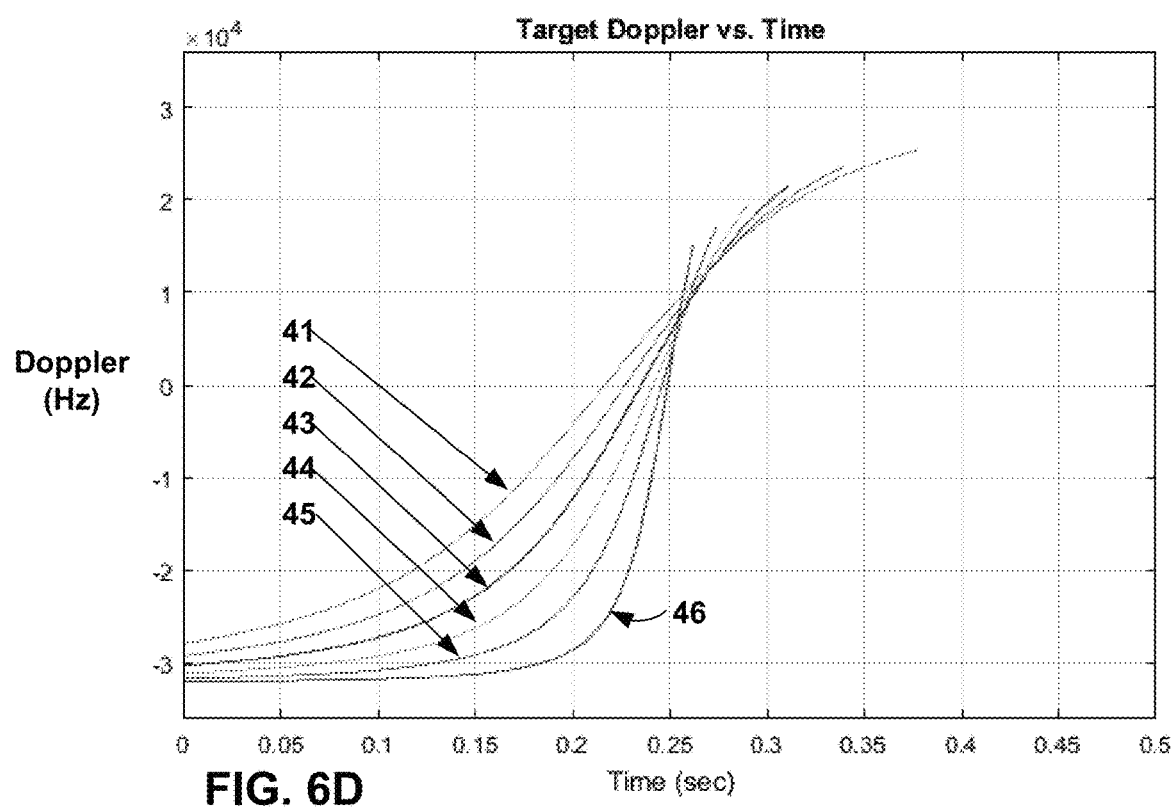

FIG. 6A is a graph depicting point-target trajectories originating from an azimuth of 45° with different miss distances relative to the radar location. The target FOR entry point is the same for each trajectory 41-46. As with FIGS. 5B-5D above, FIGS. 6B-6D depict, respectively target projectile range history, target projectile range vs. Doppler frequency shift and target projectile Doppler history. As with FIGS. 5A-5D above and the figures below, an inspection of the bearing history of the target projectiles may unambiguously distinguish the trajectories from each other.

Figure 7A:
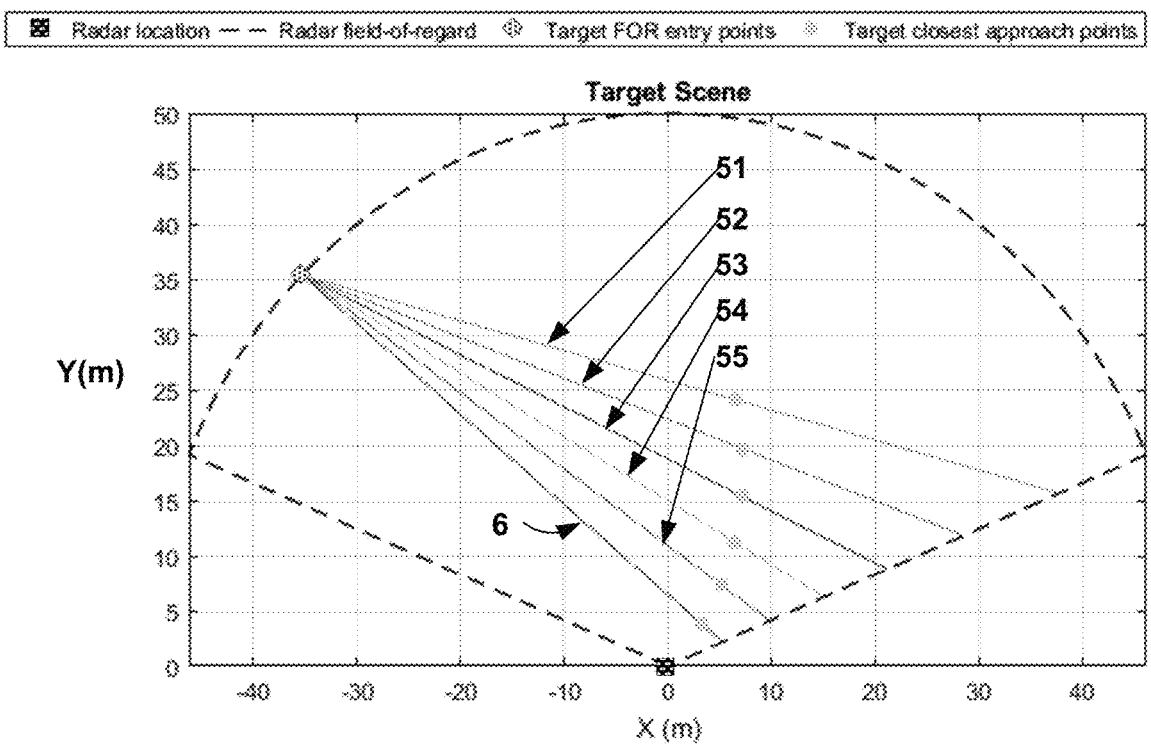
FIG. 7A is a graph depicting six point-target trajectories originating from an azimuth of 135° with different miss distances.
Figure 7B:
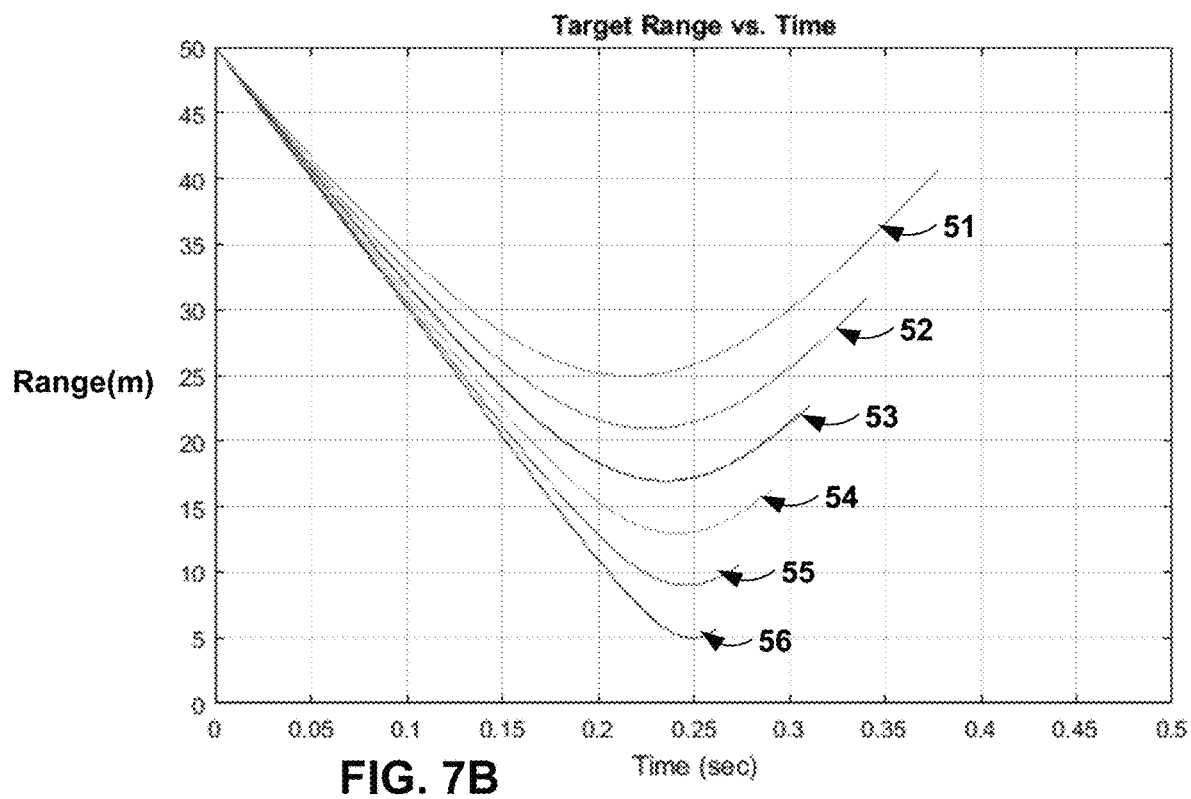
FIGS. 7B 7D depict, respectively target projectile range history, target projectile range vs. Doppler frequency shift and target projectile Doppler history.
Figure 7C:
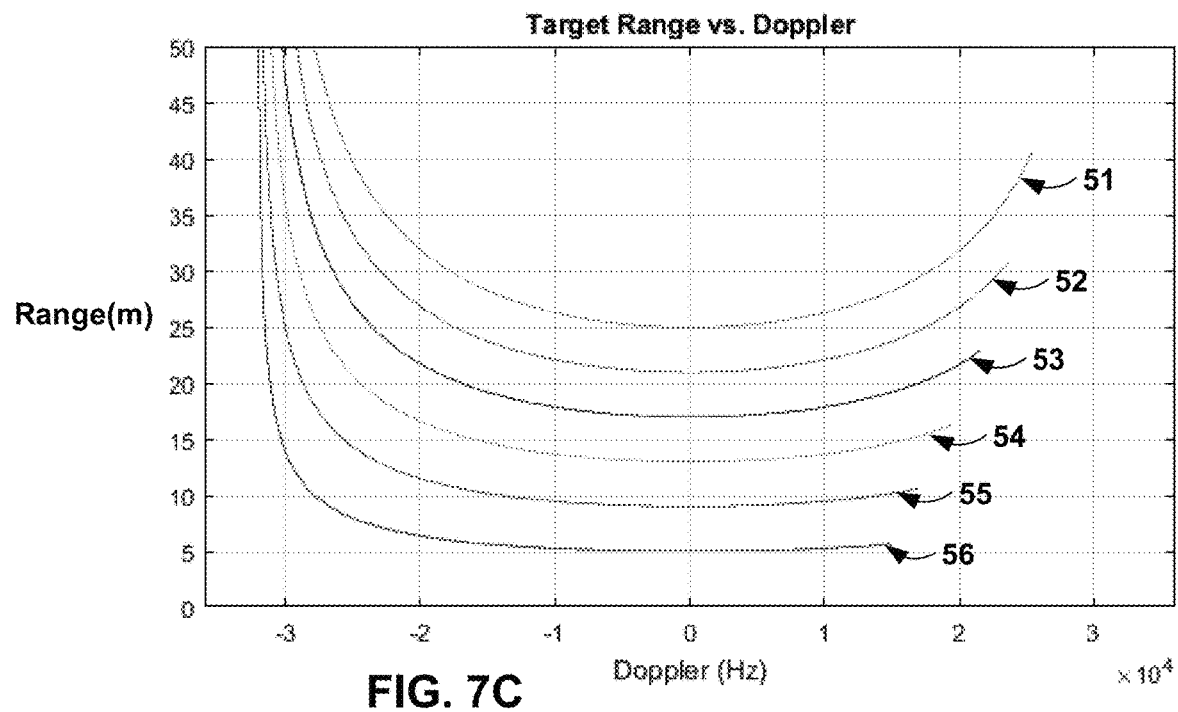
Figure 7D:
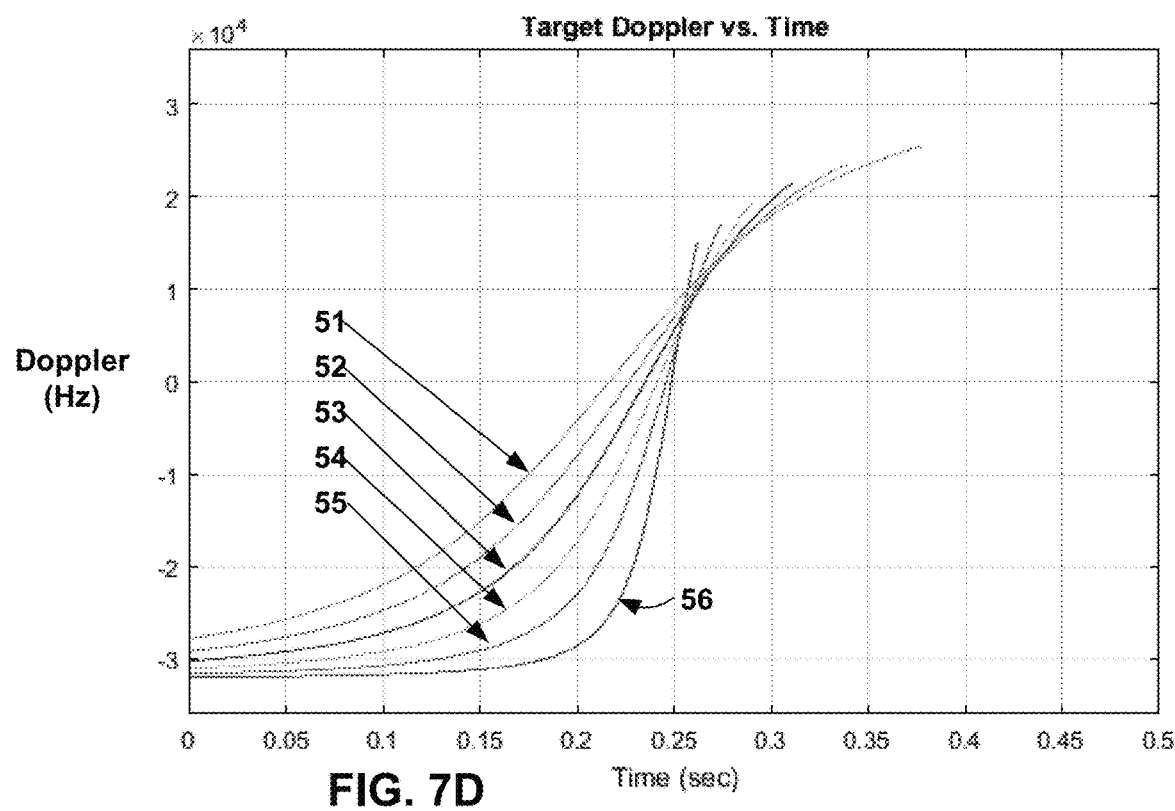

FIG. 7A is a graph depicting six point-target trajectories originating from an azimuth of 135° with different miss distances. FIG. 7A is similar to FIG. 6A, except from the trajectories 51-56 come from the opposite direction than trajectories 41-46. FIGS. 7B-7D depict, respectively target projectile range history, target projectile range vs. Doppler frequency shift and target projectile Doppler history. Comparing FIGS. 7B-7D with FIGS. 6B-6D show that the graphs are nearly identical. In the examples of FIGS. 6A-6D and FIGS. 7A-7D, each of the trajectories appear to be distinct based only on the range history and/or Doppler histories. However, the trajectories are not defined unambiguously in this way because the range and Doppler histories are equivalent in both examples. FIGS. 7A-7D and FIGS. 6A-6D depict a type of ambiguity that an FMCW radar device may resolve by monopulse signal processing to determine bearing history, according to the techniques of this disclosure.

Figure 8A:
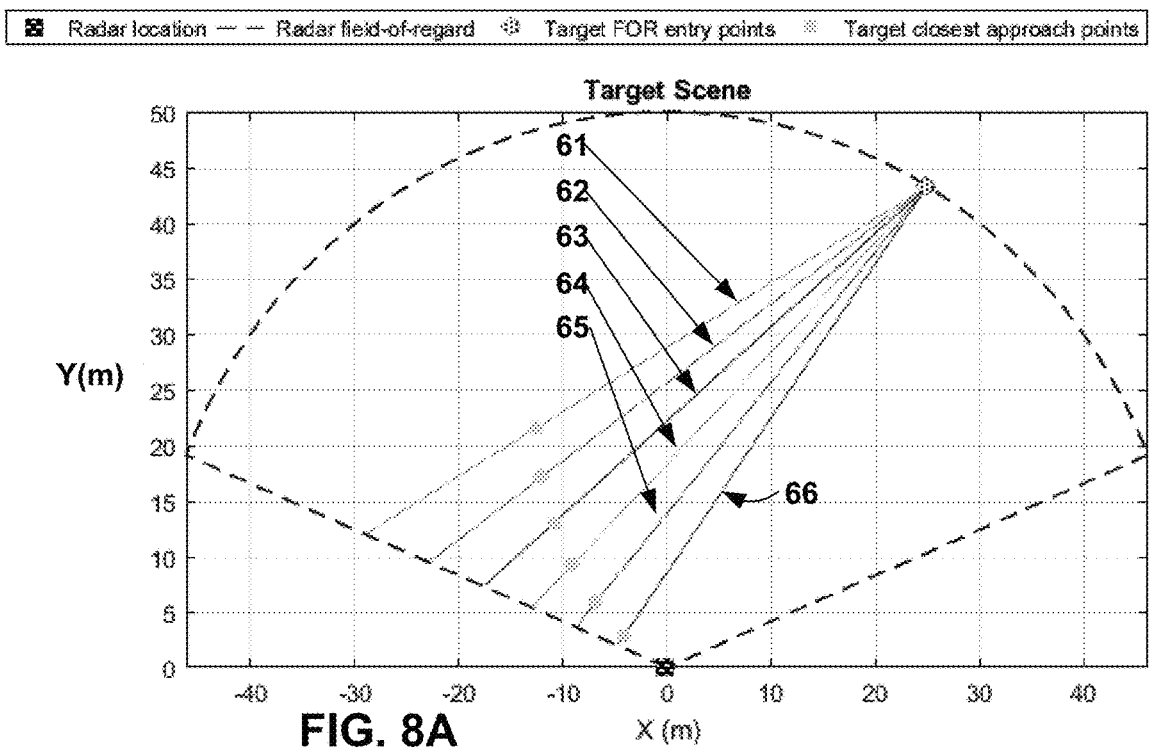
FIG. 8A is a graph depicting six point-target trajectories originating from an azimuth of 60° with different miss distances.
Figure 8B:
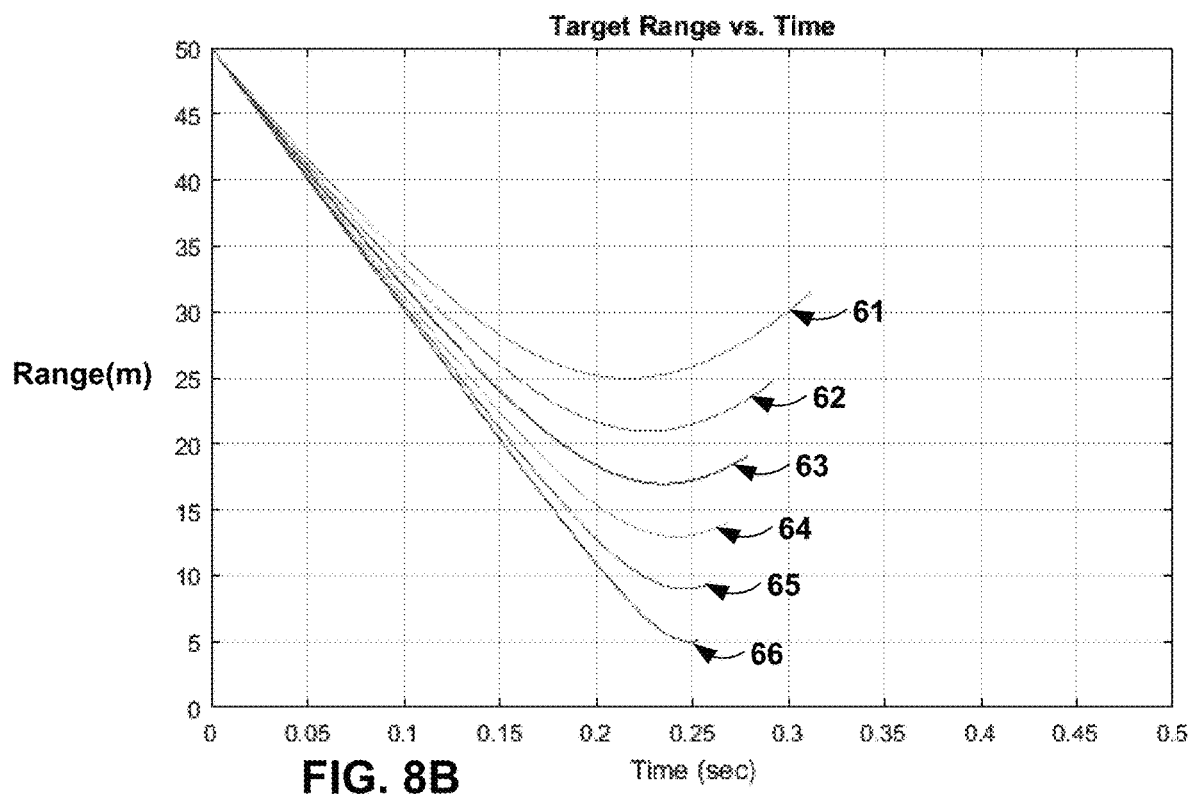
FIGS. 8B-8D depict, respectively target projectile range history, target projectile range vs. Doppler frequency shift and target projectile Doppler history.
Figure 8C:
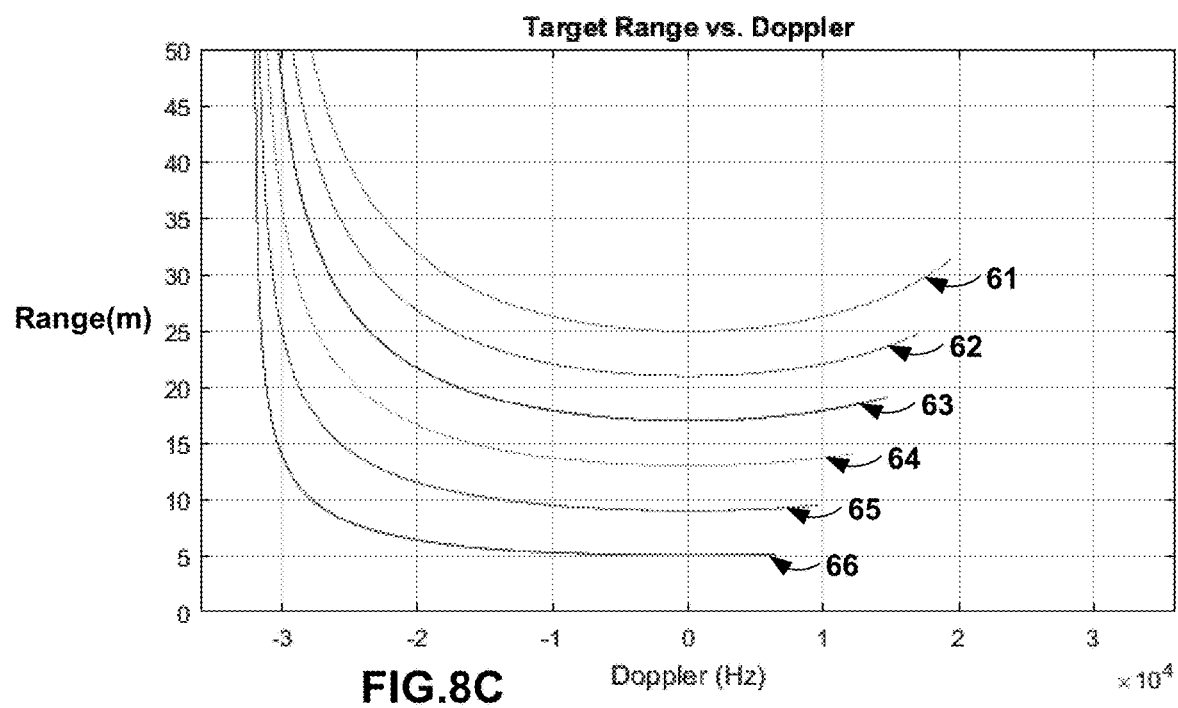
Figure 8D:
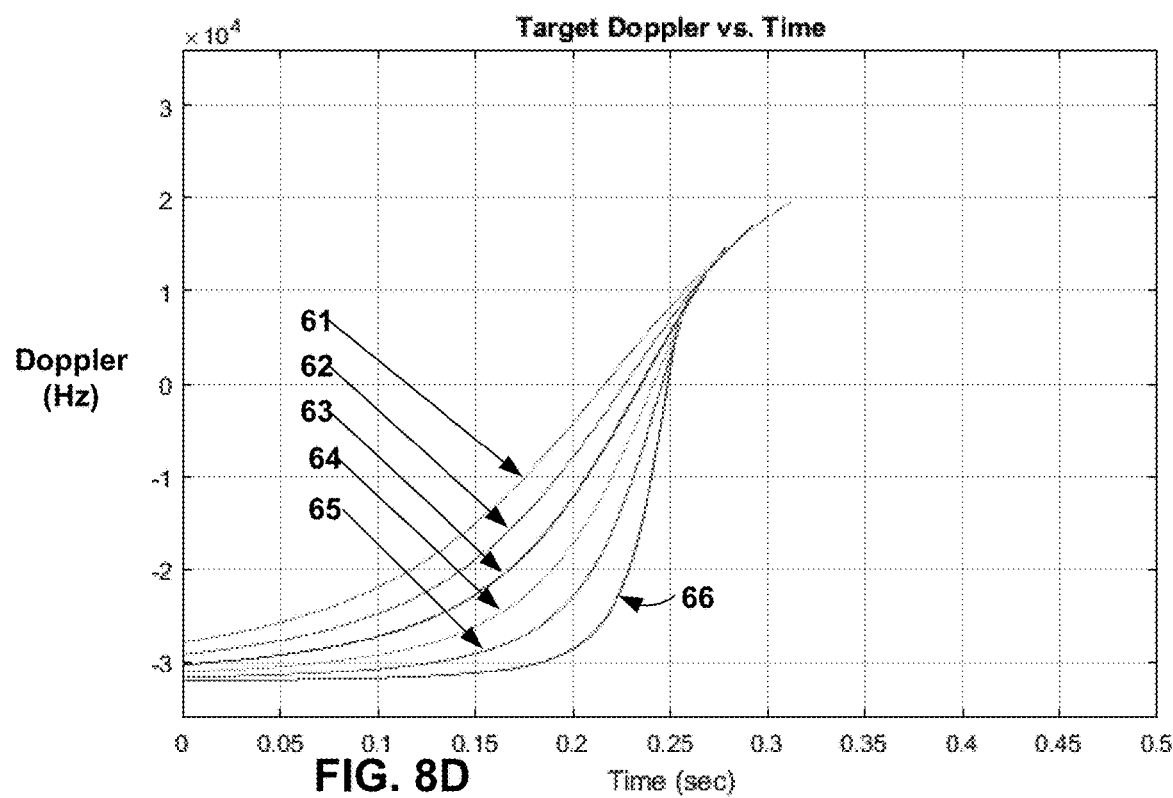

FIG. 8A is a graph depicting six point-target trajectories originating from an azimuth of 60° with different miss distances. As with FIGS. 6A and 7A, the target FOR entry point is the same for each trajectory 61-66. FIGS. 8B-8D depict, respectively target projectile range history, target projectile range vs. Doppler frequency shift and target projectile Doppler history.

Figure 9A:
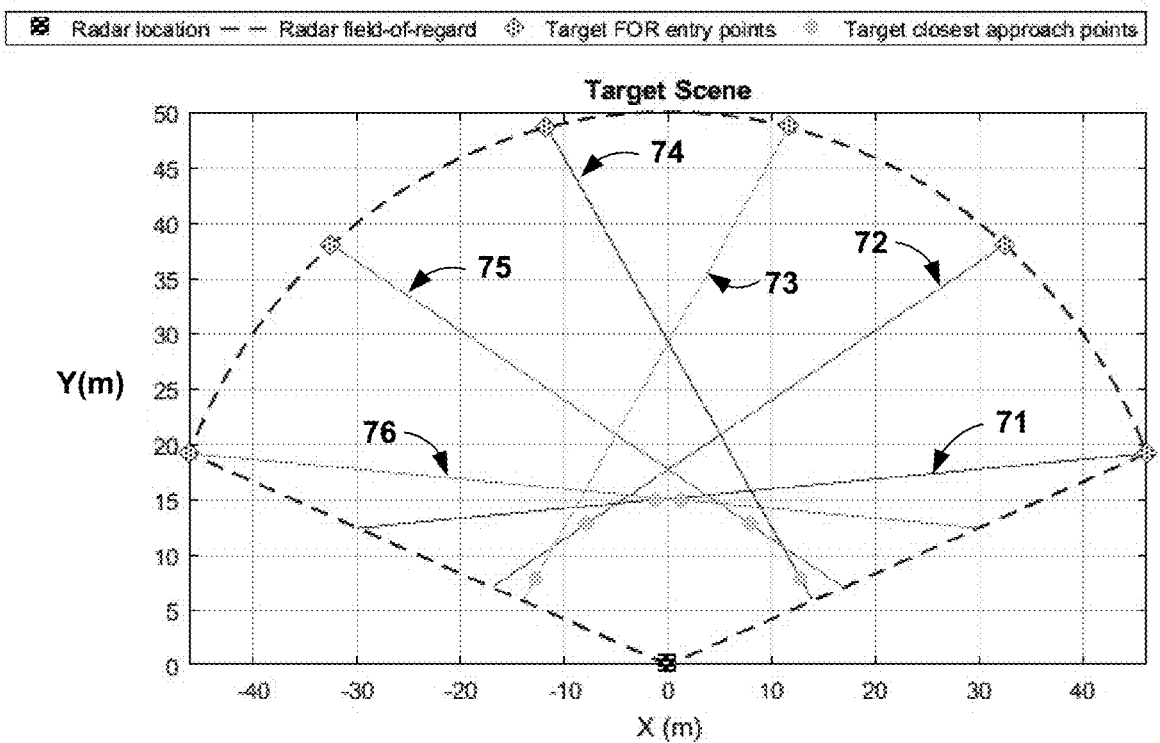
FIG. 9A is a graph depicting six point-target trajectories with a miss distance of 1.5 m originating from different azimuths.
Figure 9B:
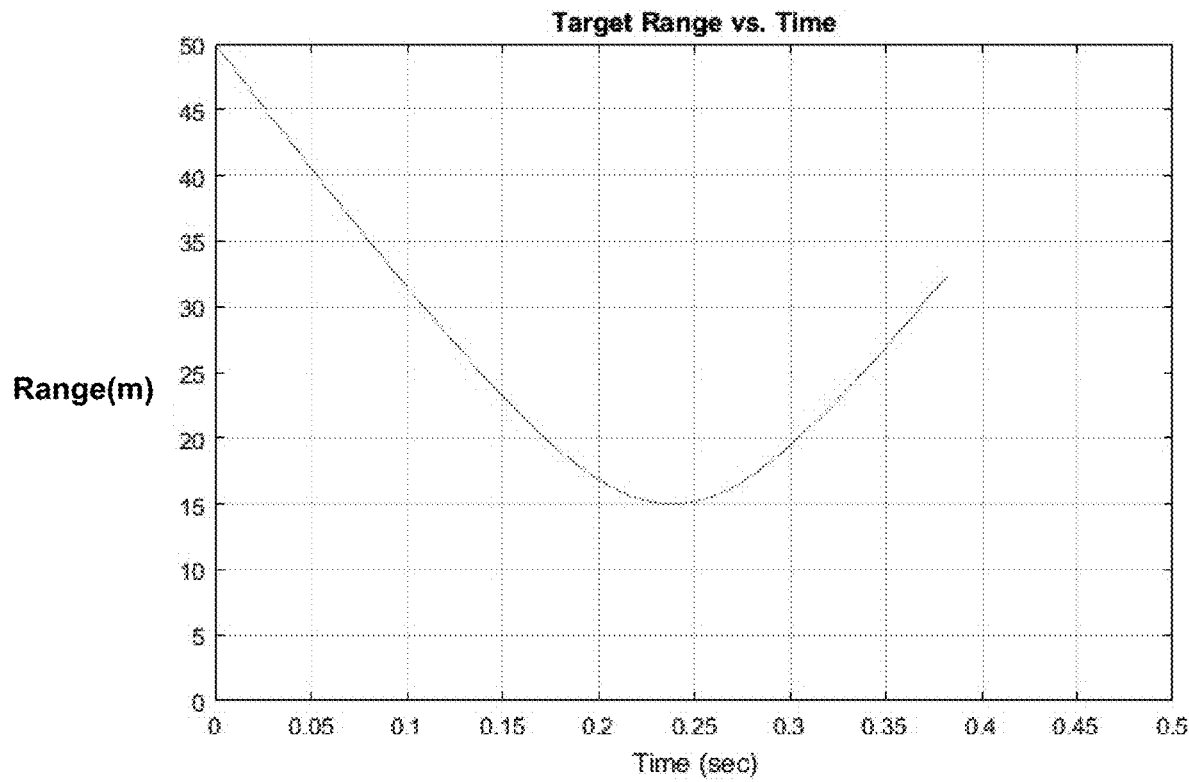
FIGS. 9B-9D depict, respectively target projectile range history, target projectile range vs. Doppler frequency shift and target projectile Doppler history.
Figure 9C:
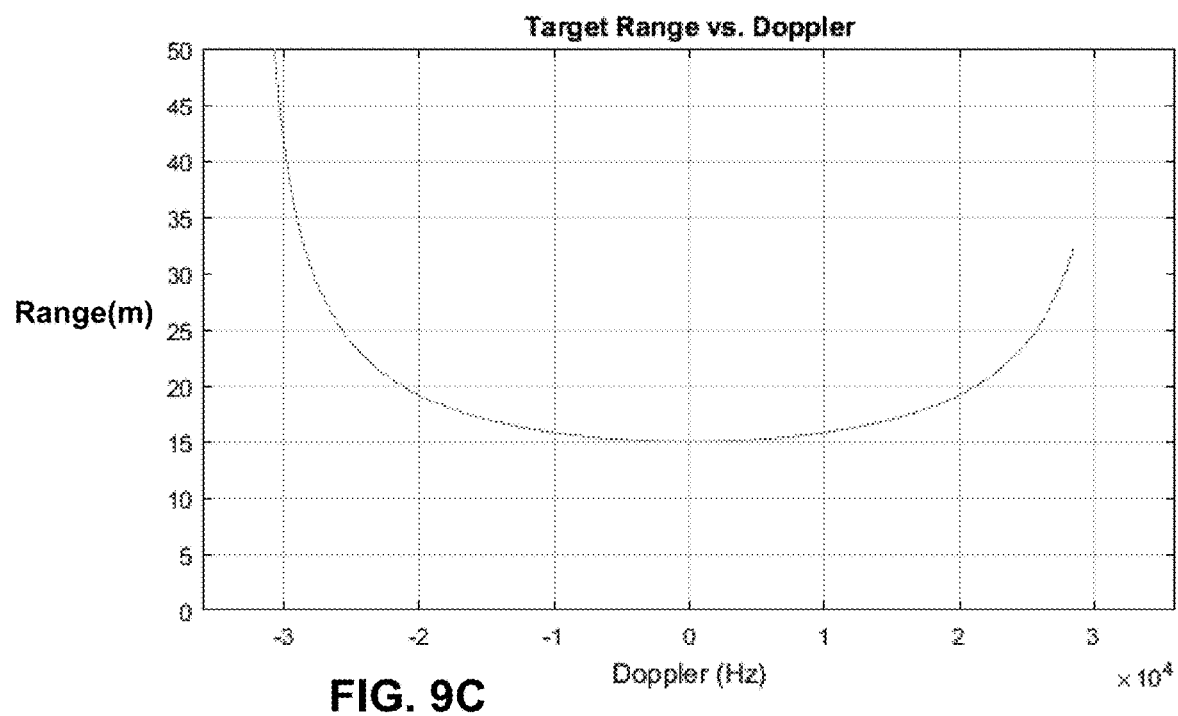
Figure 9D:
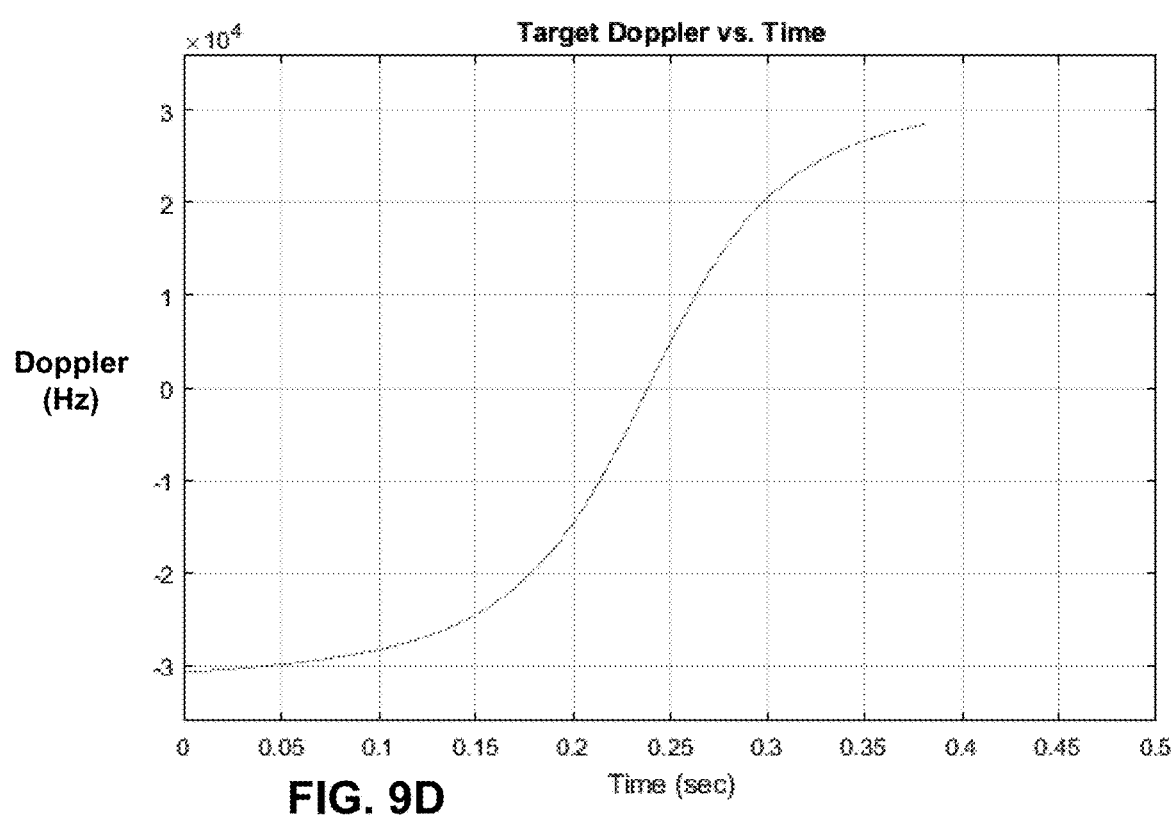

FIG. 9A is a graph depicting six point-target trajectories with a miss distance of 15 m originating from different azimuths. FIGS. 9B-9D depict, respectively target projectile range history, target projectile range vs. Doppler frequency shift and target projectile Doppler history. Though each of the trajectories 71-76 have a different FOR entry point and travel in different directions, all trajectories may yield nearly the same curve for target projectile range history, target projectile range vs. Doppler frequency shift and target projectile Doppler history. In the examples of FIGS. 9A-9D the extent of the curve observed for each target in the FOR may be different because the different targets may be in the FOR for different amounts of time. For example, each target projectile may have the same speed, but the path lengths may be different for different starting azimuths. This effect may also be seen by comparing the range and Doppler histories from FIGS. 6 and 7 with those of FIG. 8.

FIGS. 5A-9D above depict several examples of target projectile paths through the radar FOR. A projectile, such as a bullet, rocket-propelled grenade (RPG) or similar projectile may pass through a radar system's FOR at hundreds of meters per second. To efficiently and rapidly provide information to a vehicle operator, a radar system, in accordance with the techniques of this disclosure may provide limited information about a target projectile's trajectory, such as miss distance and angle of origin, rather than tracking and displaying the entire trajectory. The radar system may determine the requisite measurements of the projectile at any two or more distinct points along the trajectory. The radar system may infer the parameters (aka properties or features) of the trajectory by making reasonable assumptions about the trajectory. For example, one assumption may include that the trajectory is a straight line through the radar FOR. This assumption is reasonable because of how quickly the projectiles move and how limited the range extent of the FOR is for the HFD feature. If one of the points at which measurements are made is determined to be the point of closest approach (e.g. by measuring the Doppler to be zero), then the constraints associated with this point may mean that less additional information measured at another point is required to fully estimate the trajectory and desired parameters of the trajectory.

Figure 10A:
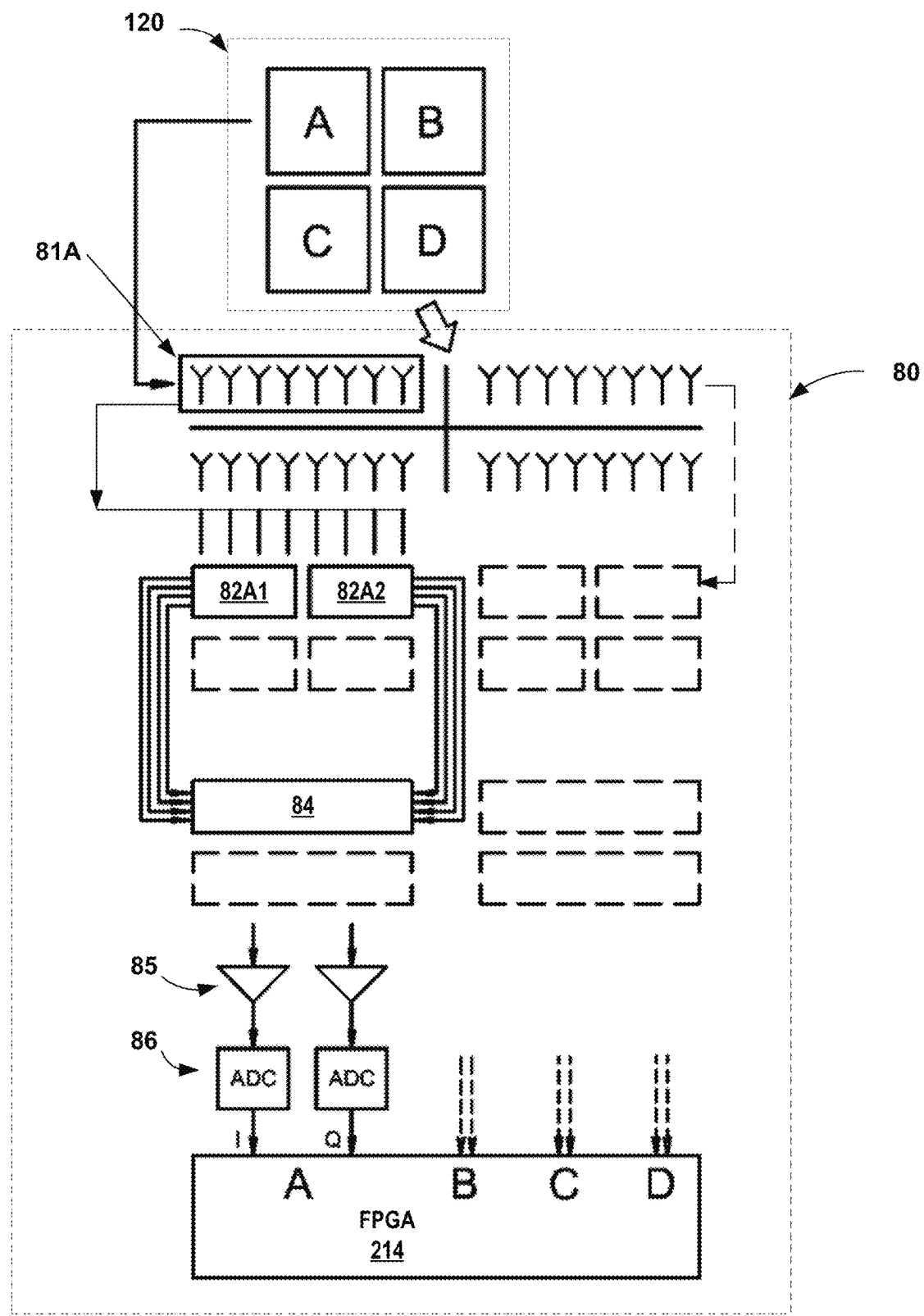
FIG. 10A is a conceptual and schematic block diagram of an example radar receiver electronics that may be used in an FMCW radar device, in accordance with one or more techniques of this disclosure.

FIG. 10A is a conceptual and schematic block diagram of an example radar receiver electronics that may be used in an FMCW radar device, in accordance with one or more techniques of this disclosure. As described above, the hazardous fire detection features of the FMCW radar device, such as FMCW radar device 100 depicted in FIG. 2 may take advantage of the structural and processing capabilities of FMCW radar device 100, such as radar transmitter electronics and radar receiver electronics. In some examples, the hazardous fire detection features may include separate radar transmitter and receiver electronics, however, by using electronic components and circuits that are used for other features of FMCW radar device 100 may provide several advantages. Some advantages may include fewer components, reduced size and weight, lower cost and higher efficiency, including reduced power consumption. The description of FIG. 10A will focus on the hazardous fire detection features of FMCW radar device 100.

Radar receiver electronics 80 depicted in FIG. 10A downconvert received radar signal from four-element receive antenna 120 to an intermediate frequency (IF) and to lower frequencies for further processing, which may include monopulse digital beamforming. FIG. 10A depicts the signal flow for receive element 120A in detail and depicts the signal flow for receive elements 120B-120D as dashed boxes. The signal flow for receive element 120A includes SIW signal path 81A, receivers 82A1 and 82A2, analog front end (AFE) 84, amplifiers 85, analog to digital converters (ADC) 86, and FPGA 214.

SIW signal path 81A includes RF signal paths in the SIW layer, such as SIW antenna layer 102 depicted in FIG. 2. Receivers 82A1 and 82A2 downconvert the received radar signal, which may be reflected from projectile 4, shown in FIG. 1. Receivers 82A1 and 82A2, in the example of FIG. 10A may be multi-channel receiver downconverters. An example of a receiver that may implement the functions of receiver 82A1 may include the ADF5904 from Analog Devices.

The output from receivers 82A1 and 82A2 goes to AFE 84. AFE 84 may be a multi-channel device that provides a variety of functions including amplification, harmonic rejection, anti-aliasing filtration and other functions. Some examples of AFE 84 may include a variable gain amplifier (VGA) with a low noise amplifier (LNA) for each channel, an I/Q demodulator and a digital demodulator and decimator for data processing and bandwidth reduction. Performing signal processing at a lower frequency, such as in the ultrasound frequency range may provide advantages over signal processing at RF frequencies. Some advantages include reduced need for shielding, smaller and lighter components, lower cost, reduced power consumption and other similar advantages. An example AFE that may implement the functions of AFE 84 may include octal ultrasound AFE AD9670 from Analog Devices.

The output from AFE 84 goes to amplifiers 84 and ADCs 86 as separate in-phase and quadrature signals (I and Q) before FPGA 214 receives the signals. In some examples, the amplification, filtration and ADC functions of amplifiers 84 and ADCs 86 may be included in AFE 84.

Some examples of the hazardous fire detection system, which includes one or more FMCW radar devices, may transmit and receive radar signals in the K-band (24.00-24.25 GHz). The signal processing may be in the ultrasound frequency range, as discussed above. The FMCW radar device may have advantages in small size, light weight and lower power consumption than other conventional radar devices. In some examples the FMCW radar device, including the hazardous fire detection features may be approximately 100 mm×200 mm×23 mm (4"×8"×0.9"), weigh approximately 635 g (1.4 lb) and consume approximately 20 W. As described above, the radar range resolution of the FMCW radar device for the path of the projectile may be less than 1 meter and the radar angular resolution may be approximately 0.8 to 1.6 degrees. The wide FOR and fine image resolution from the full monopulse processing, which in some examples may be 8 degrees by 8 degrees, means the FMCW radar device may output information that may be used for DVE image formation on a DVE display. In some examples, 8×8 degree image resolution is obtained via electronic beam scanning for some functions of FMCW radar device 100, which may meet the needs of the DVE imaging function. The monopulse processing separately may provide the 0.8 to 1.6 degrees resolution for the HFD function.

Some example implementations to achieve a wide FOR with sufficient transmit power to detect small, high speed projectiles may include FMCW radar device with an approximate range of 50 meters and a modulation frequency of 40 kHz pulse repetition frequency (PRF). In FMCW modes, the modulation scheme may be a triangle modulation scheme. A triangle modulation scheme may provide advantages over other types of modulation schemes, such as sawtooth, sinusoidal and other such schemes, for hazardous fire detection. The increasing and decreasing frequency in the triangle modulation scheme may improve range and Doppler accuracy by correcting for range-Doppler coupling through averaging of transmit frames with increasing and decreasing frequency, in this application.

Figure 10B:
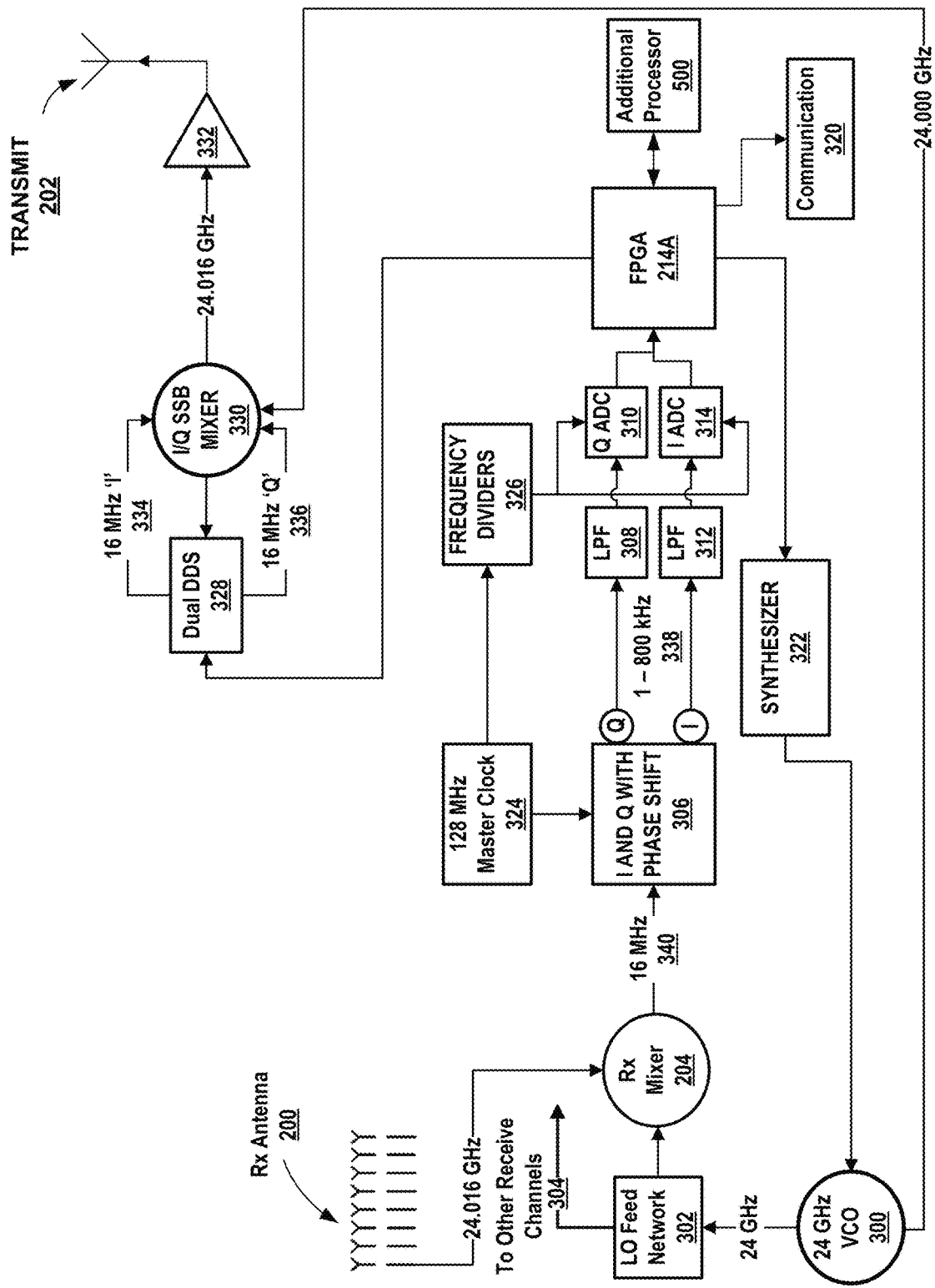
FIG. 10B is a conceptual and schematic block diagram of an example radar receive electronics, processing circuitry and radar transmitter electronics that may be used in an FMCW radar device.

FIG. 10B is a conceptual and schematic block diagram of an example radar receive electronics, processing circuitry and radar transmitter electronics that may be used in an FMCW radar device. The example diagram of FIG. 10B depicts a single receive channel and an example implementation of superheterodyne up and down converting between RF frequencies and other frequencies. Other receive channels are not shown in FIG. 10B for clarity.

FIG. 10B includes additional details of portions of FMCW radar device 100 shown in FIG. 10A. FIG. 10B may include receive (Rx) antenna 200, SIW Tx antenna 202 and Rx mixer 204 as shown in FIG. 4. FIG. 10B depicts VCO 300, local oscillator (LO) feed network 302 and other receive channels 304, along with I and Q unit 306, low pass filters (LPF) 308 and 312 and analog to digital converters 310 and 314. Other radar electronics may include FPGA 214A, synthesizer 322, 128 MHz master clock 324, frequency dividers 326, dual digital direct synthesis (DDS) unit 328, I/Q single side band (SSB) mixer 330, and amplifier 332. Also, communication electronics 320, which may receive information from FPGA 214A. Some functions shown as separate blocks in FIG. 10B may be included in other functional blocks. For example, LPF 308 may be included in AFE 84 depicted in FIG. 10A.

The radar receiver electronics depicted in FIG. 10B down-convert received radar signal from Rx antenna 200 to an intermediate frequency (IF) of 16 MHz (340) and to lower frequencies for further processing, which may include receive beam steering, for some functions of the FMCW radar device. The radar transmitter electronics may transmit RF energy through transmit (Tx) antenna 202.

VCO 300, as shown in the example of FIG. 10B, generates a 24 GHz signal which is distributed to the LO feed network 302 and further to Rx mixer 204. LO feed network 302 may function, for example, as an eight-way power divider, a two-way power divider or some other divider. VCO 300 also distributes 24 GHz to I/Q SSB mixer 330. VCO 300 may receive input from synthesizer 322. 24 GHZ is shown as one example. In other examples VCO 300 may generate other frequencies, such as 13 GHz.

LO Feed network 302 may output the 24.0 GHz LO signal to other receive channels 304 as well as Rx mixer 204, which functions the same as Rx mixers 82A1 and 82A2, shown in FIG. 10A. In the example of FIG. 10B, Rx mixer 204 converts the 24.016 GHz reflected radar signal from Rx antenna 200 to an intermediate frequency (IF) of 16 MHz (340). These frequency values are only for illustration. FMCW radar device 100 may also use other frequencies. Rx mixer 204 may output the IF of 16 MHz (340) to I and Q unit 306.

Synthesizer 322 may utilize a method of changing the division ratio within a digital PLL synthesizer to provide frequencies that are not integral multiples of the comparison frequency. A divider may take a fractional division ratio rather than an integer ratio by alternating between division ratios. One example may include a fractional N synthesizer that uses the digital phase-locked loop (PLL). Analog Devices component ADF4159, a direct modulation fractional-N frequency synthesizer, is one example of a fractional N synthesizer. However, in sonic examples fractional N synthesizers may generate spurious signals that appear as false targets in the receiver. Other examples of synthesizer 322 may include a direct digital synthesizer that may have advantages over a fractional N synthesizer.

Frequency synthesis may use various forms of direct digital synthesizer, phase-locked loop, frequency multiplier and other methods. Synthesizer 322 may generate a linear FMCW waveform and may receive control and other inputs from FPGA 214A.

I and Q unit 306 may include a phase shift function along with the in-phase and quadrature function. A monopulse radar may need to act information both from the real and imaginary portions of the returned radar signal. I and Q unit 306 may provide a representation of the returned radar signal at the intermediate frequency (IF) of 16 MHz, as shown in FIG. 10B. These frequencies listed in FIG. 10B are just for illustration. Other frequencies may also be used. The quadrature down conversion may divide the 128 MHz oscillator signal by eight, e.g. 8×16 MHz=128 MHz. Terms for 128 MHz master clock 324 may include reference oscillator, 128 MHz oscillator and 128 MHz clock. These terms may be used interchangeably in this disclosure.

I and Q unit 306 may perform two functions simultaneously. First, I and Q unit 306 may divide 128 MHz clock signal 324 by eight and provide a four-bit phase shift with digital control. At the same time as the four-bit phase shift, I and Q unit 306 may form the in-phase (I) and quadrature (Q) signal portions and downconvert the 16 MHz IF frequency to a base band between 1 kHz and 2 MHz. The I and Q signal portions may also be called the "I" channel and "Q" channel. The output signal from I and Q unit 306 passes through LH 308 and 312 and ADCs 310 and 314 may digitize each portion of the returned signal. ADCs 310 and 314 may receive input from frequency dividers 326. Both frequency dividers 326 and I and Q unit 306 may receive a 128 MHz clock signal from 128 MHz master clock 324. Frequency dividers 326 may output a signal to ADCs 310 and 314.

FPGA 214A may receive the separate I and Q signals from each receiver channel. FPGA 214A may combine and process the signals, including digital receive beam steering to determine the 3D position of obstacles within the radar coverage area, for some features of the FMCW radar device. FPGA 214A may process obstacle information, including size, height, rate of closure and other information and send to communication electronics 320. Communication electronics 320 may include WiFi, or other communication network interfaces that further send output information to one or more display devices. One possible example of FPGA 214A may include the Xilinx XC7k70t 7-series FPGA.

FPGA 214A may communicate with one or more additional processors, such as processor 500. In one example implementation of hazardous fire detection, FPGA 214A may send I/Q sum, I/Q azimuth difference and I/Q elevation difference signals to processor 500. Processor 500 may receive the sum and difference signals and conduct additional monopulse signal processing on each, which may include noise filtering, threshold detection, determination of range and bearing of a projectile, and similar functions. Processor 500 may communicate results with FPGA 214A as well as to external systems for notification and display to the vehicle operators, such as the flight crew of a helicopter. The communications may be via Ethernet or other communication protocols.

Processor 500 may be any implementation of a processor, as described elsewhere in this disclosure. One example of an implementation of processor 500 may include an Advanced RISC Machine (ARM), which may include a reduced instruction set computing (RISC) architecture such as systems-on-chips (SoC) that incorporate memory, interfaces, and other components. A multiple processor, system-on-chips (MPSoC) signal processor such as the Zynq 7020 from Xilinx is one such example. In some examples a RISC-based processor may require fewer transistors than other types processors and may reduce costs, heat and power use. Also, in some examples additional processor 500 and FPGA 214A may be integrated into a single MPSoC.

Radar transmitter electronics may include dual DDS 328 and I/Q SSB mixer 330. Dual DDS 328 may receive commands and control inputs from FPGA 214A and output a 16 MHz intermediate frequency I signal 334 and Q signal 336 to I/Q SSB mixer 330. An example dual DDS may include the Analog Devices AD9958.

I/Q SSB mixer 330 may receive the signals from dual DDS 328, as well as a 24 GHz signal from VCO 300. I/Q SSB mixer 330 may output radar signals to amplifier 332 and further to Radar transmit antenna 202. One example of amplifier 332 may include the HMC863 from Analog Devices. Radar transmit antenna 202 may output the radar signals in the prescribed pattern. Any reflected radar signals may impinge on SIW Rx antenna 200, and be conducted to the FPGA for processing.

Figure 11:
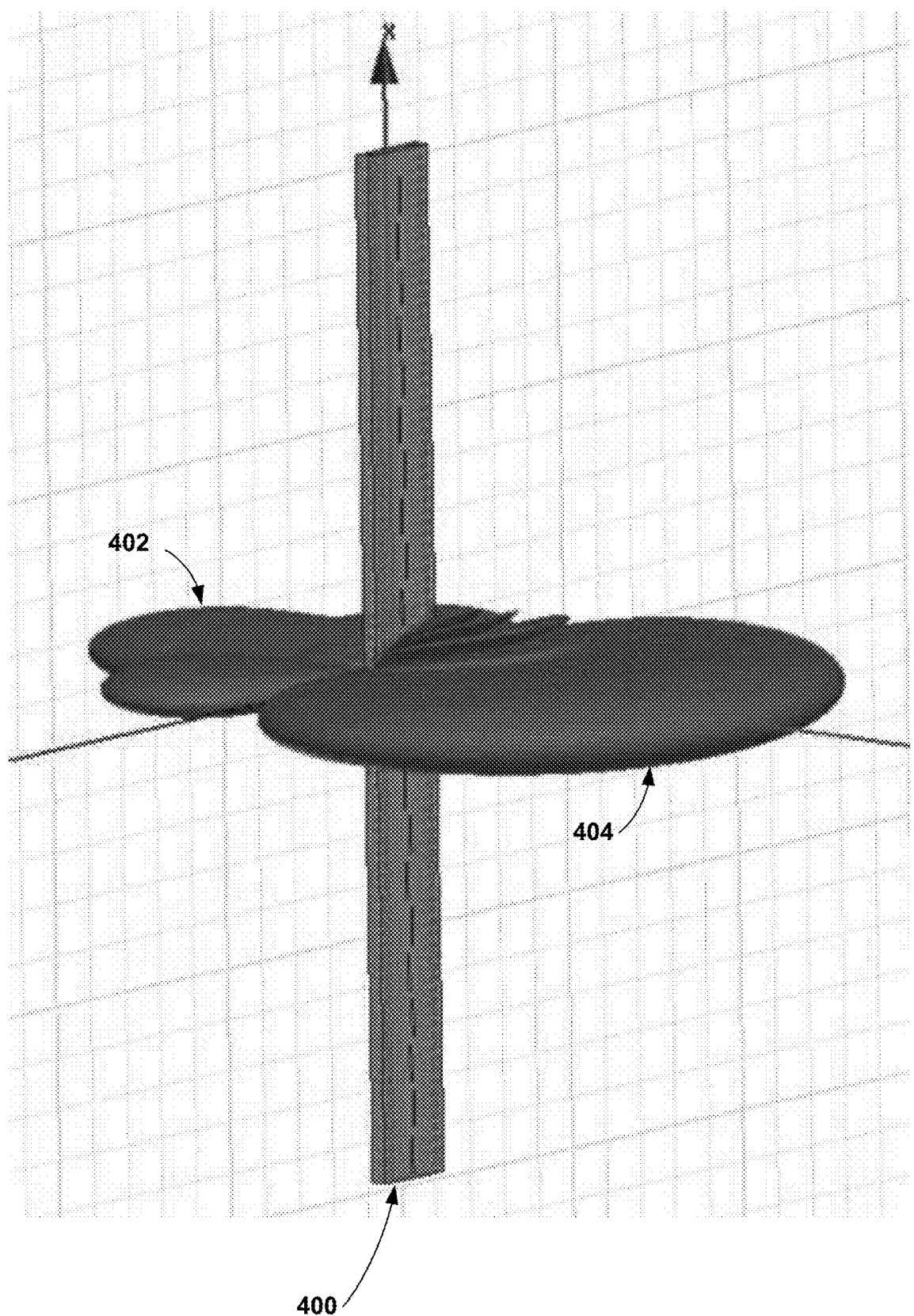
FIG. 11 is a conceptual diagram illustrating an example radar transmission pattern for some features of the FMCW radar device, not including hazardous fire detection.

FIG. 11 is a conceptual diagram illustrating an example radar transmission pattern for some features of the FMCW radar device, not including hazardous fire detection. FIG. 11 includes an example transmit antenna 400, a wide azimuth, narrow elevation main transmission beam 404 and sidelobes 402. The radar transmitter electronics, in conjunction with the radar transmit antenna 400, may be configured to output radar signals comprising a transmitted radar beamwidth of less than eight degrees in elevation and at least 65 degrees in azimuth. Radar transmit antenna 400 may function in a similar manner to SIW Tx antenna 126 shown in FIG. 2. The example transmit pattern may include low elevation sidelobes, which may have the advantages of preventing false alerts and erroneous detections.

Figure 12A:
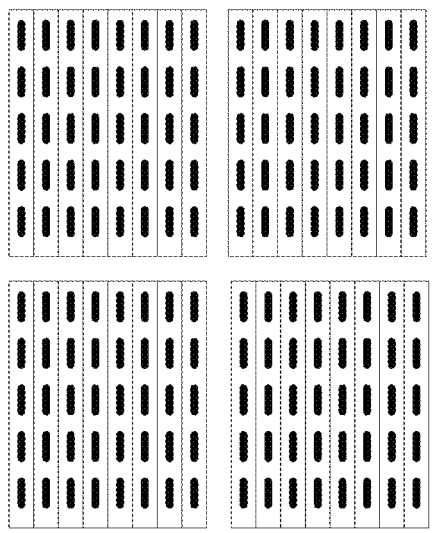
FIGS. 12A-12C are conceptual diagrams illustrating example radar receive pattern for some features of the FMCW radar device, in accordance with one or more techniques of this disclosure.
Figure 12B:
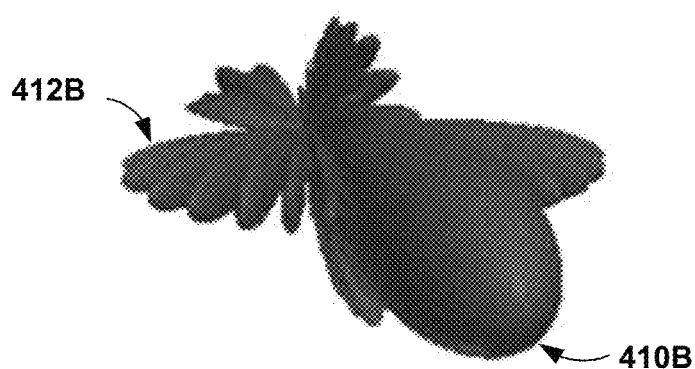
Figure 12C:
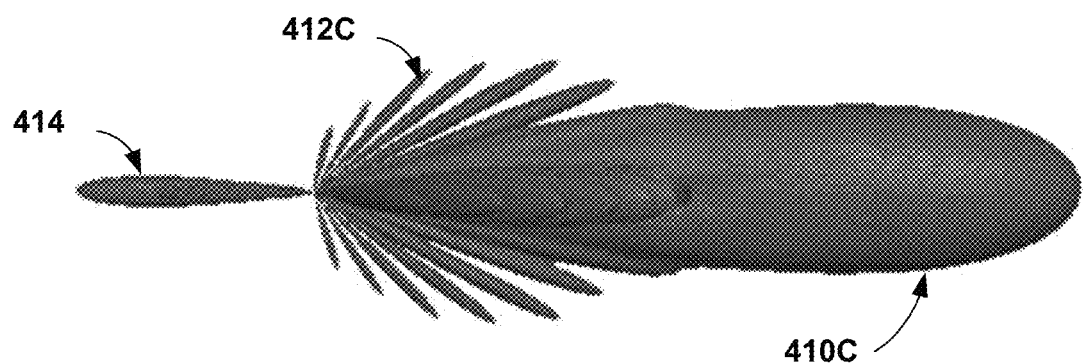

FIGS. 12A-12C are conceptual diagrams illustrating example radar receive pattern for some features of the FMCW radar device, in accordance with one or more techniques of this disclosure. FIG. 12A includes an example slotted waveguide radar receive antenna 122A, which is similar to the SIW Rx array 122 shown in FIG. 2. FIG. 12B depicts an example receive radar pattern with main receive lobe 410B and side lobes 412B. The digital beamforming circuitry of the radar receiver electronics may electronically form and steer the receive beam. Note that the steerable beam feature depicted in FIGS. 12B-12C may not include the hazardous projectile detection features discussed elsewhere in this disclosure. FIG. 12C depicts a side view of an example radar receive pattern including main lobe 410C, side lobes 412C and rear lobe 414. The beam steering radar receive pattern may include a target detection radar imaging resolution of three square meters or better at a range of 100 meters. The receive pattern may include a radar range resolution of at least 1 meter and radar angular resolution is no more than one and one-half degrees in azimuth and elevation for some features of the FMCW radar device, in addition to the hazardous fire detection features described above.

Figure 13:
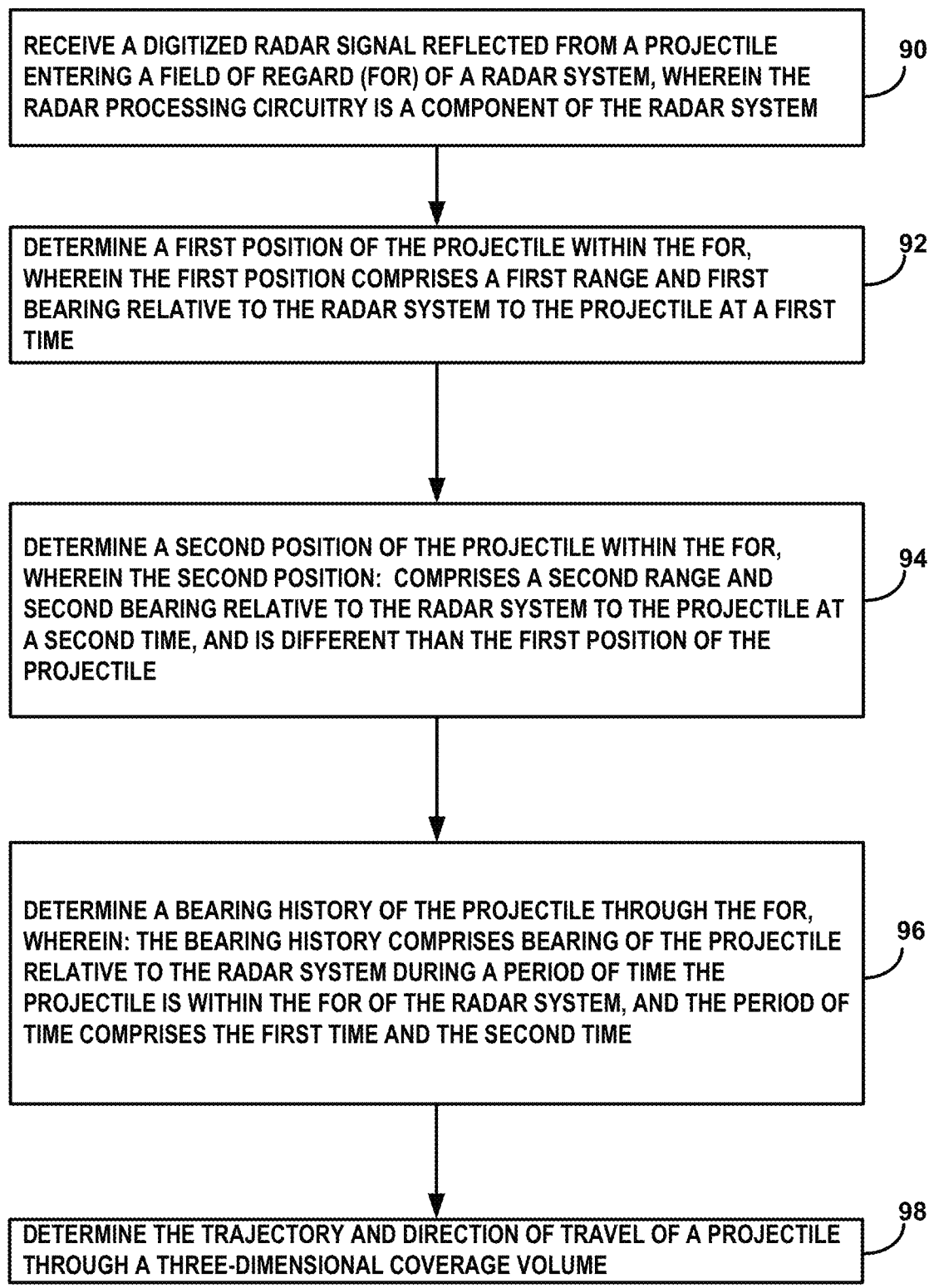
FIG. 13 is a flow chart illustrating an example mode of operation of a hazardous fire detection radar system.

FIG. 13 is a flow chart illustrating an example mode of operation of a hazardous fire detection radar system. The steps of FIG. 13 will be described in terms of FIGS. 1, 3, 10A and 10B.

The radar transmitter electronics of an FMCW radar device, such as FMCW radar devices 100A and 100B, output radar signals via a radar transmit antenna 202 over a three-dimensional coverage volume around a vehicle, such as helicopter 2. Radar transmitter electronics may include FPGA 214A, Dual DDS 328, I/Q SSB mixer 330, amplifier 332.

The radar signal processing circuitry, including the receive electronics of the FMCW radar device, receive a digitized radar signal reflected from a projectile, e.g. projectile 4, entering FOR 1 of the radar system (90). As discussed above a hazardous fire detection radar system, such as radar system 5 depicted in FIG. 3B, may include one or more FMCW radar devices. The reflected radar signals from projectile 4 may impinge on Rx antenna 200 and be conducted to FPGA 214A through Rx mixer 204, I and Q unit 306, LPFs 308 and 312 and digitized by ADCs 310 and 314.

The radar signal processing circuitry, including FPGA 214, may determine a first position of projectile 4 within FOR 1. The first position includes a first range and first bearing relative to the radar system to the projectile at a first time (92). A bearing from the radar system to projectile 4 may include angular components of both azimuth and elevation. In some examples the first position may be a target projectile FOR entry point, where projectile 4 is first detected within FOR 1 of the radar system. In other examples, the first position may be some other point along the trajectory 6 of projectile 4, In some examples, FPGA 214A may communicate with one or more additional processors 500 to determine the first position of projectile 4.

The radar signal processing circuitry determines a second position of projectile 4 within FOR 1 (94). The second position includes a second range and second bearing relative to the radar system to the projectile at a second time, and the second position is different than the first position of the projectile. In some examples the second position may be the position of a closest point of approach 8 of projectile 4 relative to helicopter 2. At the closest point of approach, projectile 4 is neither moving toward or away from the radar system, in a radial direction. Therefore, at the closest point of approach 8, the Doppler frequency shift of projectile 4 is substantially zero, within measurement tolerances.

FPGA 214A, along with one or more additional processors 500 included in the radar signal processing circuitry, may determine a bearing history of the projectile 4 through FOR 1 (96). The bearing history includes hearing of projectile 4 relative to the radar system during a period of time the projectile is within FOR 1 of the radar system. In some examples this period of time may include the first time and the second time described above.

The radar signal processing circuitry may determine the bearing history by processing the digitally formed monopulse receive beams to determine the bearing of projectile 4 over time. In some examples the radar signal processing circuitry may calculate the azimuth and elevation components of bearing separately from each other. The monopulse receive beams may be formed from signals received from each of the elements A-D of receive antenna 120 shown in FIG. 10 A. Referring to FIG. 3A, the radar signal processing circuitry may determine, for example, the direction of travel for projectile 4, by determining that projectile 4 passed first through monopulse receive beam 15 and later through monopulse receive beam 14.

With the combination of the analysis of the received radar signals reflected by projectile 4 described above, e.g. range history, Doppler history, and bearing history, the radar signal processing circuitry may determine the trajectory and direction of travel of projectile 4 through the three-dimensional coverage volume. By unambiguously determining both the trajectory and the direction of travel, FMCW radar device 100 may determine the miss distance 10 (range of closest approach) and the angle of the incoming hostile fire. The angle of incoming fire may include some uncertainty as discussed above in relation to FIG. 1.

In one or more examples, the functions described above may be implemented in hardware, software, firmware, or any combination thereof. For example, the various components of FIG. 10B, such as the one or more additional processors 500 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, which may be a component of an MPSoC or in communication with one or more processors 500, can comprise RAM, ROM. EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as processor 500, may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

The invention claimed is:
1. A vehicular radar device, the device comprising:
a radar transmit antenna;
a radar receive antenna;
radar transmitter electronics in signal communication with the radar transmit antenna, wherein the radar transmitter electronics, in conjunction with the radar transmit antenna, are configured to output radar signals in a fixed, wide transmit beam, over a three-dimensional coverage volume around a vehicle;
radar receiver electronics in signal communication with the radar receive antenna, wherein the radar receiver electronics comprise digital beamforming circuitry configured to receive radar reflections from the radar receive antenna corresponding to the outputted radar signals; and
one or more processors in signal communication with the radar receive electronics, and configured to determine characteristics of a path of a projectile through the three-dimensional coverage volume around the vehicle based on the radar reflections.

2. The device of claim 1, wherein the one or more processors determine the one or more characteristics of the path by determining a Doppler history of the projectile through the three-dimensional coverage volume around the vehicle.

3. The device of claim 1, wherein the one or more processors determine the one or more characteristics of the path by determining a range history of the projectile through the three-dimensional coverage volume around the vehicle.

4. The device of claim 1, wherein the digital beamforming circuitry is configured to process the radar reflections to generate a monopulse beam signal, and wherein the one or more processors are further configured to resolve an ambiguity in the characteristics of the path of the projectile by comparing the monopulse beam signal to the characteristics of the path.

5. The device of claim 1, wherein the characteristics of the path of the projectile through the three-dimensional coverage volume around the vehicle include one or more of a miss range, a position of a closest point of approach of the projectile relative to the vehicle, a direction of travel of the projectile, and a trajectory of the projectile.

6. The device of claim 1, further comprising a digital active phased array (DAPA) radar comprising the radar transmit antenna and the radar receive antenna; and wherein the radar transmitter electronics are configured to output frequency modulated continuous wave (FMCW) radar signals.

7. The device of claim 1, wherein the three-dimensional coverage volume around the vehicle includes a field of regard (FOR) of at least 135 degrees in azimuth and 135 degrees in elevation, relative to the device.

8. The device of claim 1, wherein the digital beamforming circuitry is configured to generate four monopulse receive beams over the three-dimensional coverage volume around the vehicle.

9. The device of claim 1, wherein the one or more processors are further configured to generate an output including notification of the projectile passing through the three-dimensional coverage volume around the vehicle.

10. The device of claim 9, wherein the output includes characteristics of the path of the projectile sent to a display unit, wherein the display unit is configured to generate a three-dimensional (3D) image of the path of the projectile.

11. The device of claim 1, wherein a radar range resolution of the path of the projectile is less than 1 meter and a radar angular resolution is less than 1.6 degrees.

12. The device of claim 1, wherein the digital beamforming circuitry is configured to:
operate in the ultrasonic frequency range; and
use heterodyne processing.

13. A vehicle mounted radar system, the system comprising:
one or more FMCW radar devices, wherein each of the one or more FMCW radar devices comprises:
a radar transmit antenna;
a radar receive antenna;
radar transmitter electronics in signal communication with the radar transmit antenna, wherein the radar transmitter electronics, in conjunction with the radar transmit antenna, are configured to output radar signals in a fixed, wide transmit beam, over a three-dimensional coverage volume around a vehicle,
radar receiver electronics in signal communication with the radar receive antenna, wherein the radar receiver electronics comprise digital beamforming circuitry configured to receive radar reflections from the radar receive antenna corresponding to the outputted radar signals; and
one or more processors operably coupled to the one or more FMCW radar devices and configured to determine characteristics of a path of a projectile through the three-dimensional coverage volume around the vehicle based on the radar reflections.

14. The system of claim 13, wherein the digital beamforming circuitry is configured to process the radar reflections to generate a monopulse beam signal, and wherein the one or more processors are further configured to resolve an ambiguity in the characteristics of the path of the projectile by comparing the monopulse beam signal to the characteristics of the path.

15. The system of claim 13, wherein the characteristics of the path of the projectile through the three-dimensional coverage volume around the vehicle include one or more of a miss range, a position of a closest point of approach of the projectile relative to the vehicle, a direction of travel of the projectile, and a trajectory of the projectile.

16. A method to determine a trajectory and direction of travel of a projectile through a three-dimensional coverage volume, the method comprising:
receiving, by radar signal processing circuitry, a digitized radar signal reflected from the projectile entering a field of regard (FOR) of a radar system,
wherein the radar signal processing circuitry is a component of the radar system, and
wherein the radar signal is transmitted as a fixed, wide transmit beam;
determining, by radar signal processing circuitry, a first position of the projectile within the FOR, wherein the first position comprises a first range and first bearing relative to the radar system to the projectile at a first time;
determining, by radar signal processing circuitry, a second position of the projectile within the FOR, wherein the second position:
comprises a second range and second bearing relative to the radar system to the projectile at a second time, and
is different than the first position of the projectile;
determining, by radar signal processing circuitry, a bearing history of the projectile through the FOR, wherein:
the bearing history comprises bearing of the projectile relative to the radar system during a period of time the projectile is within the FOR of the radar system, and
the period of time comprises the first time and the second time.

17. The method of claim 16, further comprising determining at least one of a Doppler history and a range history of the projectile during the period of time the projectile is within the FOR of the radar system.

18. The method of claim 16, wherein the bearing history comprises an azimuth history of the of the projectile during the period of time the projectile is within the FOR of the radar system.

19. The method of claim 16, wherein first position of the projectile within the FOR at the first time is a projectile FOR entry point.

20. The method of claim 16, wherein the second position of the projectile within the FOR at the second time is a point of closest approach of the projectile to the radar system, wherein the closest point of approach is a position wherein a Doppler frequency of the projectile is substantially zero.

* * * * *